United States Patent
Shinzaki et al.

(10) Patent No.: US 7,200,753 B1
(45) Date of Patent: Apr. 3, 2007

(54) AUTHENTICATION APPARATUS AND COMPUTER-READABLE STORAGE MEDIUM

(75) Inventors: Takashi Shinzaki, Kawasaki (JP); Yusaku Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/271,249

(22) Filed: Mar. 17, 1999

(30) Foreign Application Priority Data

Jun. 23, 1998 (JP) .................................. 10-175836

(51) Int. Cl.
*H04L 9/00* (2006.01)
(52) U.S. Cl. ....................................... 713/182; 713/168
(58) Field of Classification Search ................ 713/186, 713/200–202, 182; 382/115; 340/5.52, 340/5.53, 5.54, 5.82; 380/275, 276; 726/4, 726/5
See application file for complete search history.

(56) References Cited

U.S. PATENT DOCUMENTS

| | | | | |
|---|---|---|---|---|
| 5,291,560 A | * | 3/1994 | Daugman | 351/206 |
| 5,984,366 A | * | 11/1999 | Priddy | 283/72 |
| 6,038,315 A | * | 3/2000 | Strait et al. | 713/183 |
| 6,088,802 A | * | 7/2000 | Bialick et al. | 713/200 |
| 6,092,192 A | * | 7/2000 | Kanevsky et al. | 382/115 |
| 6,111,506 A | * | 8/2000 | Yap et al. | 340/5.86 |

FOREIGN PATENT DOCUMENTS

JP 58-31478 2/1983

* cited by examiner

Primary Examiner—Kambiz Zand
(74) Attorney, Agent, or Firm—Staas & Halsey LLP

(57) ABSTRACT

An authentication apparatus includes a measuring unit measuring biometric information of an individual, a converting unit carrying out a predetermined conversion process with respect to the biometric information so as to obtain converted biometric information, an extracting unit extracting feature information from the converted biometric information so as to obtain extracted feature information, and a verifying unit verifying the extracted feature information with respect to the registered information which is registered in advance, so as to authenticate the individual.

24 Claims, 18 Drawing Sheets

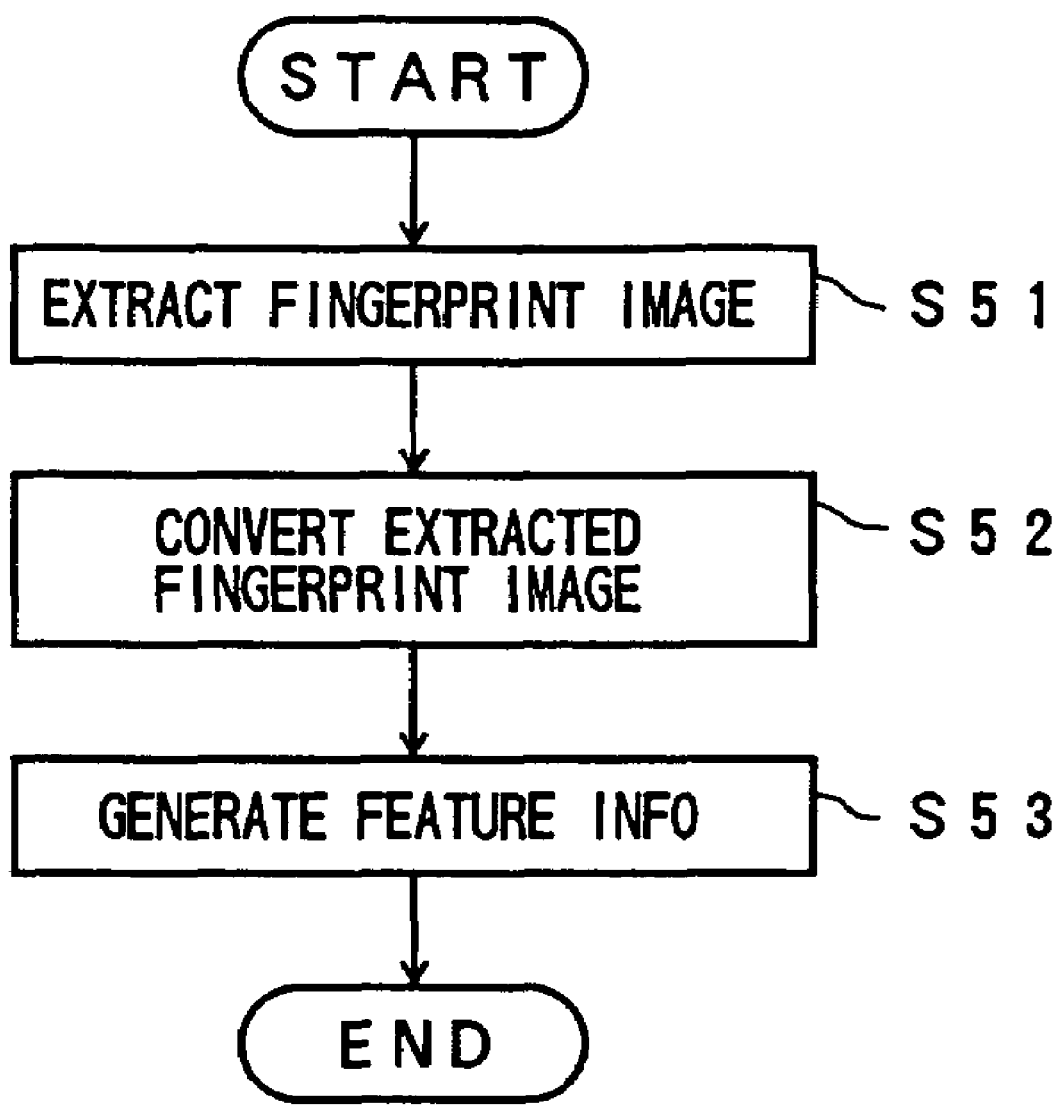

AUTHENTICATION APPARATUS AND COMPUTER-READABLE STORAGE MEDIUM

BACKGROUND OF THE INVENTION

1. Field of the Invention

The present invention generally relates to authentication apparatuses and storage mediums, and more particularly to an authentication apparatus which authenticates individuals using biometric information and to a computer-readable storage medium which stores a program for causing a computer to carry out such an authentication.

Recently, due to popular use of computer networks, there are demands for techniques to confirm that a user is the person himself when making data access, approval, transfer, payment or the like on the computer network. When biometric information peculiar to the individual is used for the authentication of a certain individual, it is possible to positively authenticate this certain individual because other individuals cannot have the biometric information of this certain individual.

In this specification, the biometric information refers to information which is peculiar to an individual, different for each individual, and normally remains unchanged as long as the individual lives. This biometric information may be a fingerprint, voice pattern, palmar pattern, face, iris, retina, vascular pattern, signature or the like.

2. Description of the Related Art

First, a description will be given of an example of a conventional authentication apparatus. The biometric information such as the fingerprint is converted into electronic information such as image information by various sensors such as a CCD camera. This electronic information is subjected to various kinds of information processing so as to extract information which is used as a key that is required for a biometric information verification process. Thereafter, biometric key information of each of registered individuals and the extracted biometric key information are verified, so as to authenticate the individual.

In the case where the fingerprint is used as the biometric information, for example, patterns of crests are used as the biometric information. Fine undulations or lines are formed at the human finger tips, and convex portions of such undulations are referred to as crests. The crests form a pattern which is peculiar to each individual. In addition, when the crest is followed, various points exist, such as a branch point where the crest branches into a plurality of branches and an end point where the crest terminates. Distributions of such branch points and end points are different for each individual, and such points on the crest are also referred to as feature points of the fingerprint. When verifying the fingerprints, the position, type and direction of the feature points of the input fingerprint are compared with the position, type and direction of the registered fingerprints, and the sameness of the input fingerprint with one of the registered fingerprints is determined based on whether a match exists.

More particularly, the input fingerprint is obtained by first extracting a fingerprint image by a fingerprint sensor. The extracted fingerprint image is binarized and thinned, so as to obtain a thinned fingerprint image in which a width of the crest is 1 pixel. The feature points of the fingerprint are extracted from this thinned fingerprint image. Generally, the extracted feature points include erroneous feature points, and for this reason, a process is carried out to eliminate the erroneous feature points. Thereafter, the position, type, direction and the like of each of the feature points are collected as feature information, and this feature information is stored as input fingerprint data.

Registered fingerprint data are also obtained by carrying out processes similar to those used to obtain the input fingerprint data described above. The registered fingerprint data are registered in a storage unit or the like which forms a database.

In the authentication apparatus which uses the biometric information to confirm a user's identify when making a data access or log-in to a computer, it is necessary to register the biometric information such as the fingerprints in advance. However, if the registered biometric information is stolen, the stolen biometric information may be put to bad use, and there is also a possibility of violating privacy.

Compared to an authentication apparatus which uses a password or the like, the authentication apparatus which uses the biometric information makes it more difficult for a person to assume a false identify. But on the other hand, in the case where the biometric information of the individuals is measured and used in the authentication apparatus, it is necessary to prevent privacy information of the individuals from leaking (i.e., unauthorized disclosure to, or theft thereof by, third parties).

Conventionally, stand-alone type authentication apparatuses were the majority, but recently, the use of client-server type authentication apparatuses coupled to networks has increased. In the case of the client-server type authentication apparatus, it is necessary to register the biometric information of the individuals in a server, and transmit the biometric information via the network. For this reason, if the reliability of the server and/or the network is poor and the data management reliability is not sufficiently high, there is a possibility of the biometric information of the individuals being stolen by or leaked to an unauthorized third party.

SUMMARY OF THE INVENTION

Accordingly, it is a general object of the present invention to provide a novel and useful authentication apparatus and storage medium, in which the problems described above are eliminated.

Another and more specific object of the present invention is to provide an authentication apparatus and storage medium which can positively prevent biometric information of individuals from becoming stolen or leaking to an unauthorized third party when carrying out identity authentication using the biometric information, even in a case where the data management reliability is not sufficiently high.

Still another object of the present invention is to provide an authentication apparatus comprising measuring means for measuring biometric information of an individual, converting means for carrying out a predetermined conversion process with respect to the biometric information so as to obtain converted biometric information, extracting means for extracting feature information from the converted biometric information so as to obtain extracted feature information, and verifying means for verifying the extracted feature information with respect to registered information which is registered in advance, so as to authenticate the individual. According to the authentication apparatus of the present invention, the original biometric information cannot be read from the registered information by a third party even if the registered information leaks to the third party, because the registered information is made up of the feature information extracted from the converted biometric information.

For this reason, it is possible to positively prevent privacy information leak caused by a leak of the biometric information of the individual.

A further object of the present invention is to provide an authentication apparatus comprising measuring means for measuring biometric information of an individual, extracting means for extracting feature information from the biometric information so as to obtain extracted feature information, converting means for carrying out a predetermined conversion process with respect to the extracted feature information so as to obtain converted extracted feature information, and verifying means for verifying the converted extracted feature information with respect to registered information which is registered in advance, so as to authenticate the individual. According to the authentication apparatus of the present invention, the original biometric information cannot be read from the registered information by a third party even if the registered information leaks to the third party, because the registered information is made up of the feature information which is extracted from the biometric information and converted. For this reason, it is possible to positively prevent privacy information leak caused by a leak of the biometric information of the individual.

Another object of the present invention is to provide an authentication apparatus for authenticating an individual by verifying input biometric information with respect to registered biometric information, comprising measuring means for measuring biometric information of the individual, converting means for carrying out a predetermined conversion process with respect to the biometric information so as to obtain converted biometric information, and registering means for registering the converted biometric information. According to the authentication apparatus of the present invention, it is possible to positively prevent privacy information leak caused by a leak of the biometric information of the individual.

Still another object of the present invention is to provide an authentication apparatus comprising measuring means for measuring biometric information of an individual, converting means for carrying out a predetermined conversion process with respect to the biometric information so as to obtain converted biometric information, registering means for registering converted biometric information in advance, and verifying means for verifying the converted biometric information obtained by the converting means with respect to the converted biometric information registered in the registering means, so as to authenticate the individual. According to the authentication apparatus of the present invention, it is possible to positively prevent privacy information leak caused by a leak of the biometric information of the individual.

A further object of the present invention is to provide a computer-readable storage medium which stores a program for causing a computer to authenticate an individual, comprising measuring means for causing the computer to measure biometric information of an individual, converting means for causing the computer to carry out a predetermined conversion process with respect to the biometric information so as to obtain converted biometric information, extracting means for causing the computer to extract feature information from the converted biometric information so as to obtain extracted feature information, and verifying means for causing the computer to verify the extracted feature information with respect to registered information which is registered in advance, so as to authenticate the individual. According to the computer-readable storage medium of the present invention, the original biometric information cannot be read from the registered information by a third party even if the registered information leaks to the third party, because the registered information is made up of the feature information extracted from the converted biometric information. For this reason, it is possible to positively prevent privacy information leak caused by a leak of the biometric information of the individual.

Another object of the present invention is to provide a computer-readable storage medium which stores a program for causing a computer to authenticate an individual, comprising measuring means for causing the computer to measure biometric information of an individual, extracting means for causing the computer to extract feature information from the biometric information so as to obtain extracted feature information, converting means for causing the computer to carry out a predetermined conversion process with respect to the extracted feature information so as to obtain converted extracted feature information, and verifying means for causing the computer to verify the converted extracted feature information with respect to registered information which is registered in advance, so as to authenticate the individual. According to the computer-readable storage medium of the present invention, the original biometric information cannot be read from the registered information by a third party even if the registered information leaks to the third party, because the registered information is made up of the feature information which is extracted from the biometric information and converted. For this reason, it is possible to positively prevent privacy information leak caused by a leak of the biometric information of the individual.

Still another object of the present invention is to provide a computer-readable storage medium which stores a program for causing a computer to authenticate an individual by verifying input biometric information with respect to registered biometric information, comprising measuring means for causing the computer to measure biometric information of the individual, converting means for causing the computer to carry out a predetermined conversion process with respect to the biometric information so as to obtain converted biometric information, and registering means for causing the computer to register the converted biometric information. According to the computer-readable storage medium of the present invention, it is possible to positively prevent privacy information leak caused by a leak of the biometric information of the individual.

A further object of the present invention is to provide a computer-readable storage medium which stores a program for causing a computer to authenticate an individual, comprising measuring means for causing the computer to measure biometric information of an individual, converting means for causing the computer to carry out a predetermined conversion process with respect to the biometric information so as to obtain converted biometric information, registering means for causing the computer to register converted biometric information in advance, and verifying means for causing the computer to verify the converted biometric information obtained by the converting means with respect to the converted biometric information registered in the registering means, so as to authenticate the individual. According to the computer-readable storage medium of the present invention, it is possible to positively prevent privacy information leak caused by a leak of the biometric information of the individual.

Other objects and further features of the present invention will be apparent from the following detailed description when read in conjunction with the accompanying drawings.

BRIEF DESCRIPTION OF THE DRAWINGS

FIG. 18 is a flow chart for explaining an image conversion process;

DESCRIPTION OF THE PREFERRED EMBODIMENTS

Figure 1A:
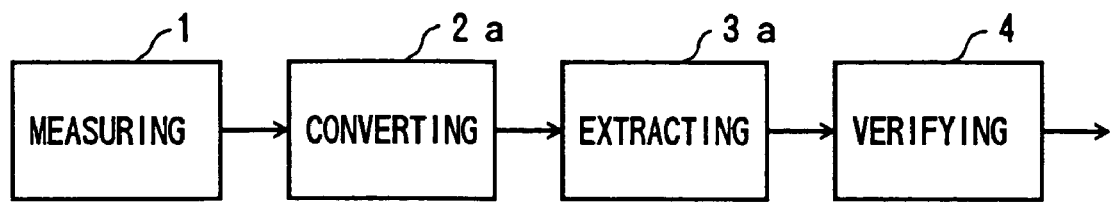
FIGS. 1A and 1B respectively are block system diagrams for explaining the operating principles of the present invention.
Figure 1B:
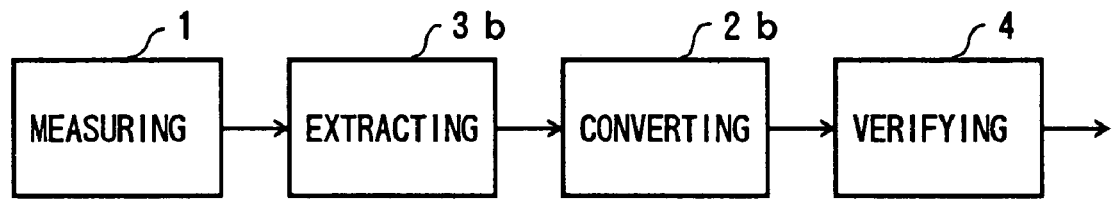

First, a description will be given of the operating principles of the present invention, by referring to FIGS. 1A and 1B.

A description will be given of a first aspect of the present invention. An authentication apparatus shown in FIG. 1A generally includes a measuring means 1 for measuring biometric information of an individual, a converting means 2a for subjecting the biometric information to a predetermined conversion process so as to obtain converted biometric information, an extracting means 3a for extracting feature information from the converted biometric information so as to obtain extracted feature information, and a verifying means 4 for verifying (e.g., by comparing) the extracted feature information with registered information of the individual, which is registered in advance, so as to authenticate the individual.

Because the registered information is made up of feature information which is extracted from converted biometric information, the original biometric information cannot be read by a third party even if the registered information is stolen or is leaked. As a result, it is possible to positively prevent a leak of privacy information caused by leak of individual biometric information.

Next, a description will be given of a second aspect of the present invention. An authentication apparatus shown in FIG. 1B generally includes a measuring means 1 for measuring biometric information of an individual, an extracting means 3b for extracting feature information from the biometric information so as to obtain extracted feature information, a converting means 2b for subjecting the extracted feature information to a predetermined conversion process so as to obtain converted extracted feature information, and a verifying means 4 for verifying the converted extracted feature information with registered information which is registered in advance, so as to authenticate the individual.

Since the registered information is made up of the feature information which is extracted from the biometric information and converted, the original biometric information cannot be read by a third party even if the registered information is stolen or is leaked. As a result, it is possible to positively prevent a leak of privacy information even if there is a leak, or a theft, of an individual's extracted and converted biometric information.

A description will hereunder be given of various embodiments of the present invention.

Figure 2:
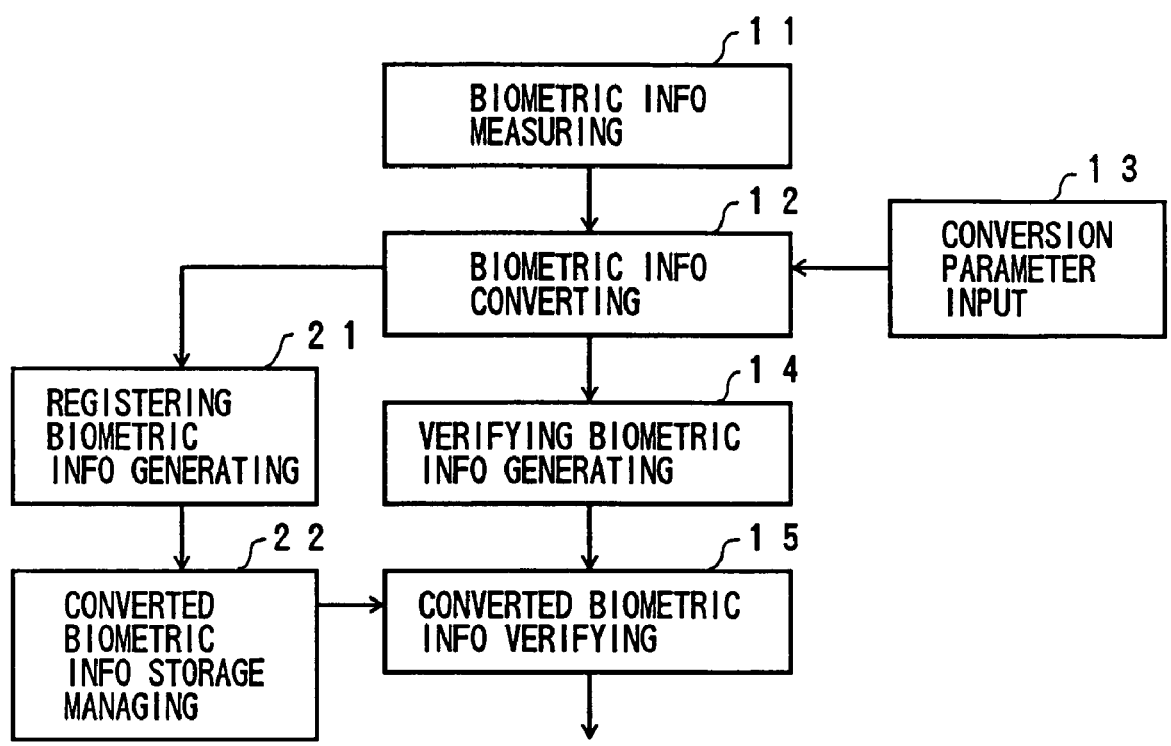
FIG. 2 is a system block diagram showing a first embodiment of an authentication apparatus according to the present invention.

FIG. 2 is a system block diagram showing a first embodiment of the authentication apparatus according to the present invention. In this embodiment, the present invention is applied to a stand-alone type authentication apparatus. In FIG. 2, the authentication apparatus generally includes a biometric information measuring unit 11, a biometric information converting unit 12, a conversion parameter input unit 13, a verifying biometric information generating unit 14, a converted biometric information verifying unit 15, a registering biometric information generating unit 21, and a converted biometric information storage management unit 22 which are coupled as shown.

The biometric information measuring unit 11 measures the biometric information of a user, that is, the individual, by a known method. For example, in the case of the fingerprint, an image of a crest pattern of the fingerprint is measured as the biometric information. In the case of the iris, an image of an iris pattern is measured as the biometric information. Further, in the case of the signature, a handwriting, a pressure applied by a writing utensil when making the handwriting, or the like is measured as the biometric information.

The biometric information converting unit 12 carries out a predetermined conversion process with respect to the biometric information measured by the biometric information measuring unit 11, based on conversion parameters input from the conversion parameter input unit 13. The biometric information may be a fingerprint, voice pattern, palmar pattern, face, iris, retina, vascular pattern, signature or the like.

In the case where the measured biometric information relates to the fingerprint, palmar pattern or face, for example, the biometric information converting unit 12 carries out a conversion process including an expansion, compression, rotation, deformation, affine transformation, morphing, coordinate transformation, function process, parameter conversion and the like, with respect to the image of the fingerprint, palmar pattern or face. On the other hand, in the case where the measured biometric information relates to the voice pattern, for example, the biometric information converting unit 12 carries out a conversion process such as a frequency conversion, a time base conversion and the like, with respect to the audio data.

In the case where the measured biometric information relates to the iris, for example, the biometric information converting unit 12 carries out a conversion process including a rearrangement of bit sequences, and the like, with respect to a one-dimensional binarized iris data extracted concentrically to a pupil. Furthermore, in the case where the measured biometric information relates to the retina, for example, the biometric information converting unit 12 carries out a conversion process including a rearrangement of bit sequences, and the like, with respect to a one-dimensional binarized retina data extracted in a circular manner.

Moreover, in the case where the measured biometric information relates to the vascular pattern, for example, the biometric information converting unit 12 carries out a conversion process including an expansion, compression rotation, deformation, affine transformation, morphing and the like, with respect to the vascular image data. In addition, in the case where the measured biometric information relates to the signature, for example, the biometric information converting unit 12 carries out a conversion process including a time base conversion, coordinate axis transformation and the like, with respect to the signature data.

The converted biometric information obtained from the biometric information converting unit 12 is supplied to the verifying biometric information generating unit 14 when verifying the biometric information, and is supplied to the registering biometric information generating unit 21 when registering the biometric information. The verifying biometric information generating unit 14 generates verifying biometric information based on the biometric information converting unit 12, and supplies the verifying biometric information to the converted biometric information verifying unit 15.

When registering the biometric information, the registering biometric information generating unit 21 generates registering biometric information based on the converted biometric information obtained from the biometric information converting unit 12. The converted biometric information storage managing unit 22 stores and manages the registering biometric information, so as to register the registering biometric information as registered biometric information.

When verifying the biometric information, the converted biometric information verifying unit 15 verifies the verifying biometric information which is obtained from the verifying biometric information generating unit 14, with respect to the registered biometric information which is obtained from the converted biometric information storage managing unit 22, and makes an authentication as to whether or not the user is actually the user himself who is registered. More particularly, the converted biometric information verifying unit 15 carries out the authentication based on whether or not the verifying biometric information and the registered biometric information match under a predetermined condition.

Accordingly, it is possible to confirm that a user is the person himself when making data access, approval, transfer, payment or the like on the computer network. The data access or the like with respect to the computer network can be permitted or prohibited, based on an identification result output from the converted biometric information verifying unit 15.

Figure 3:
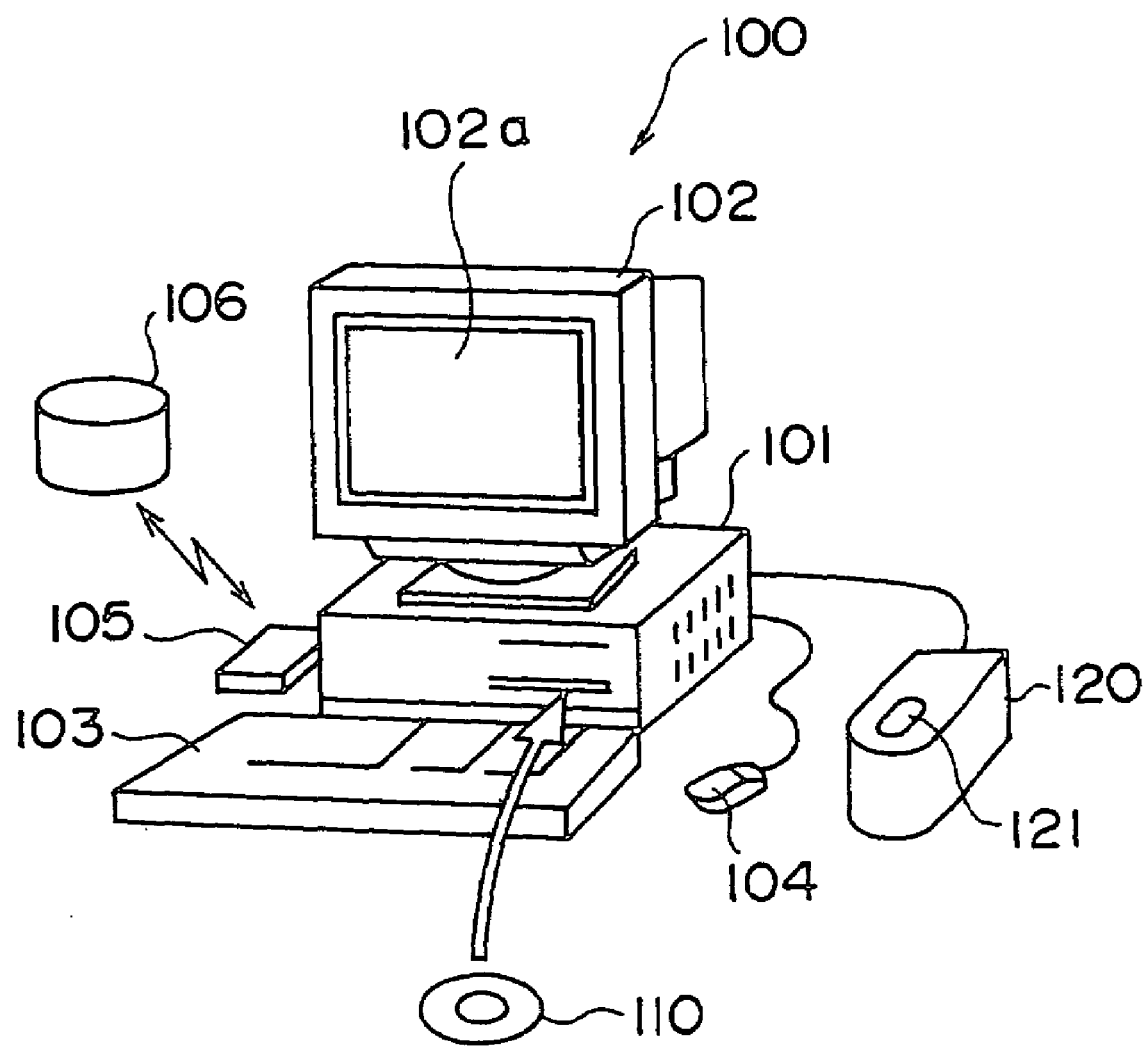
FIG. 3 is a perspective view showing a computer system.
Figure 4:
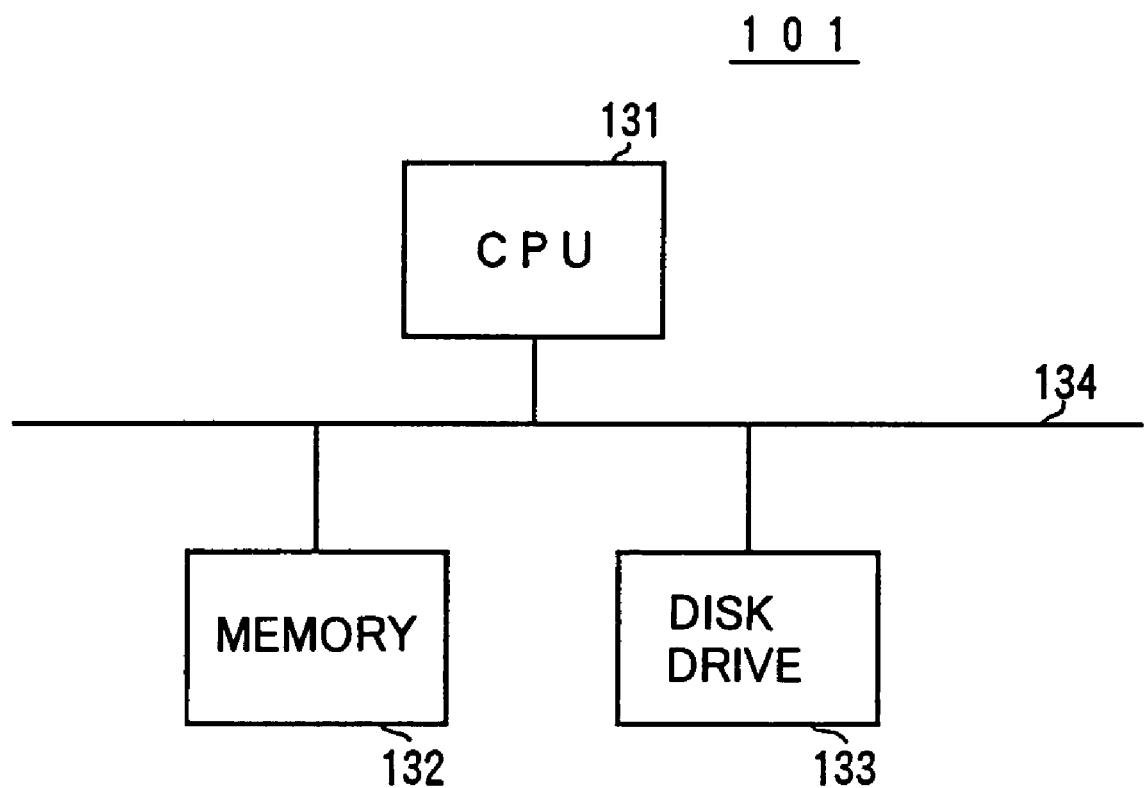
FIG. 4 is a system block diagram showing an important part of a main body part of the computer system shown in FIG. 3.

The authentication apparatus shown in FIG. 2 may be realized by a computer system shown in FIGS. 3 and 4, for example. FIG. 3 is a perspective view showing the computer system, and FIG. 4 is a system block diagram showing an important part of a main body part of the computer system shown in FIG. 3.

In FIG. 3, a computer system 100 generally includes a main body part 101 which includes a CPU, a disk drive and the like, a display 102 which includes a display screen 102*a* for displaying an image in response to an instruction from the main body part 101, a keyboard 103 which is used to input various information to the computer system 100, a mouse 104 which is used to specify an arbitrary position on the display screen 102*a* of the display 102, a modem 105 which downloads a program or the like stored in another computer system by making access to an external database or the like, a biometric information input unit 120, and the like. In this embodiment, the biometric information input unit 120 is formed by a fingerprint information input unit, for example. The fingerprint of the user is read by a known method when the user places his finger tip on a verifying part 121, and the read fingerprint image information is supplied to the main body part 101.

A program for causing the computer system 100 to carry out the authentication process is stored in a portable recording medium such as a disk 100 or, is downloaded from a recording medium 106 of another computer system using a communication unit such as the modem 105.

A storage medium according to the present invention is formed by a computer-readable storage medium which stores the above described program for causing a computer, such as the computer system 100, to carry out the authentication process. For example, the storage medium according to the present invention is formed by a disk 110 shown in FIG. 3, the recording medium 106, or the like. The kind or type of recording medium which forms the storage medium according to the present invention is not limited to a specific kind or type, and may be any kind or type of recording medium which readable by a computer system. Typical examples of the recording mediums which may form the storage medium according to the present invention are portable recording mediums such as IC card memories, floppy disks, magneto-optical disks and CD-ROMs, semiconductor memory devices such as ROMs, and recording mediums accessible by a computer system which is coupled via a communication means or a communication unit such as a modem and a LAN.

As shown in FIG. 4, an important part of the main body part 101 has a known construction including a CPU 131, a memory 132 and a disk drive 133 which are coupled via a bus 134. The CPU 131 is provided to control the general operation of the computer system 100. The memory 132 is provided to store data such as intermediate data obtained during operation processes carried out by the CPU 131. The disk drive 133 is provided to read information from a disk which stores the program which is to be executed by the CPU 131. The disk which is read by this disk drive 133 may be the disk 110 shown in FIG. 3. Of course, the program may be stored in the memory 132. In addition, it is not essential for the program to be prestored in the memory 132 or the disk within the disk drive 133, and the program may of course be downloaded from another computer system.

Figure 5:
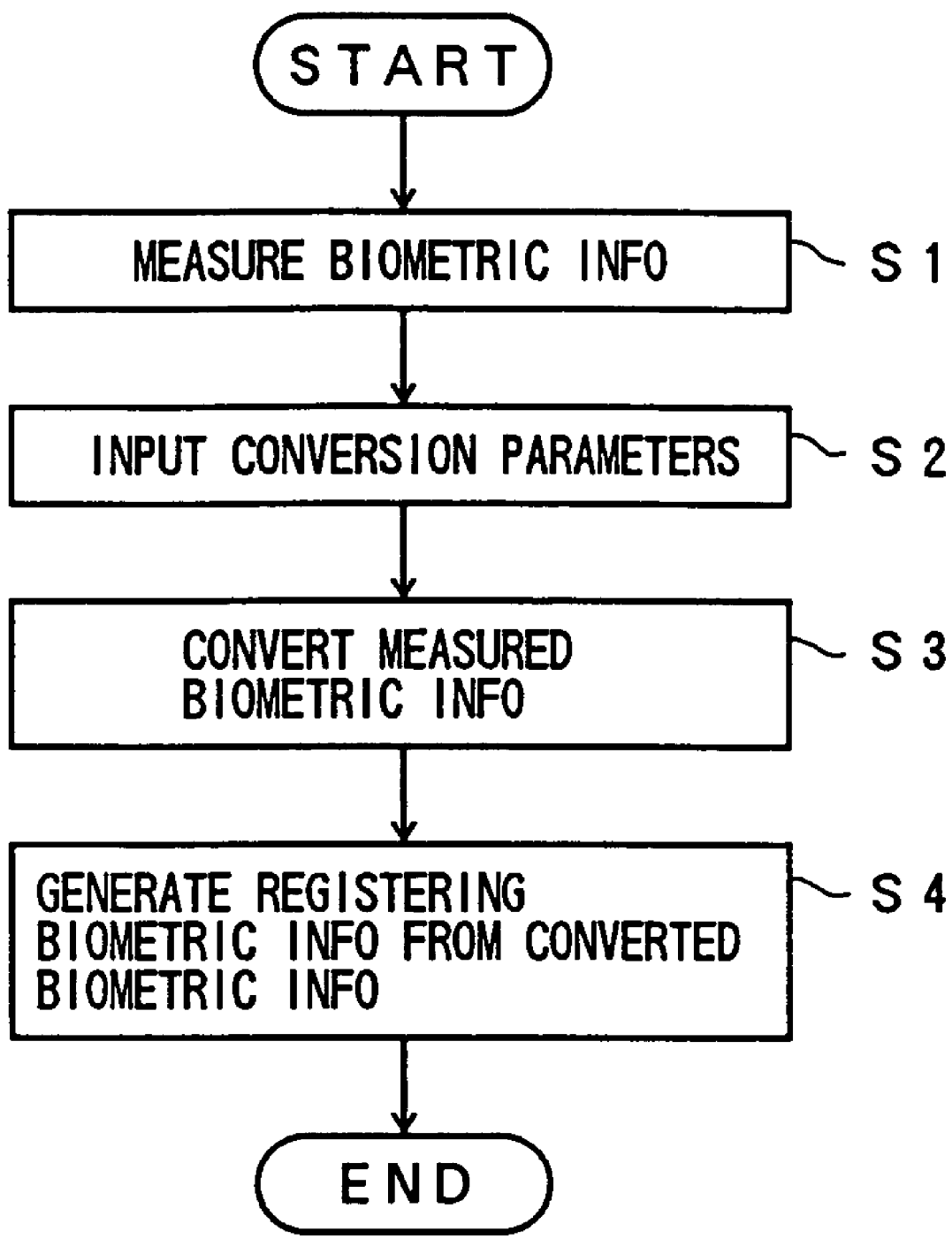
FIG. 5 is a flow chart for explaining the operation of the first embodiment of the authentication apparatus when registering biometric information.
Figure 6:
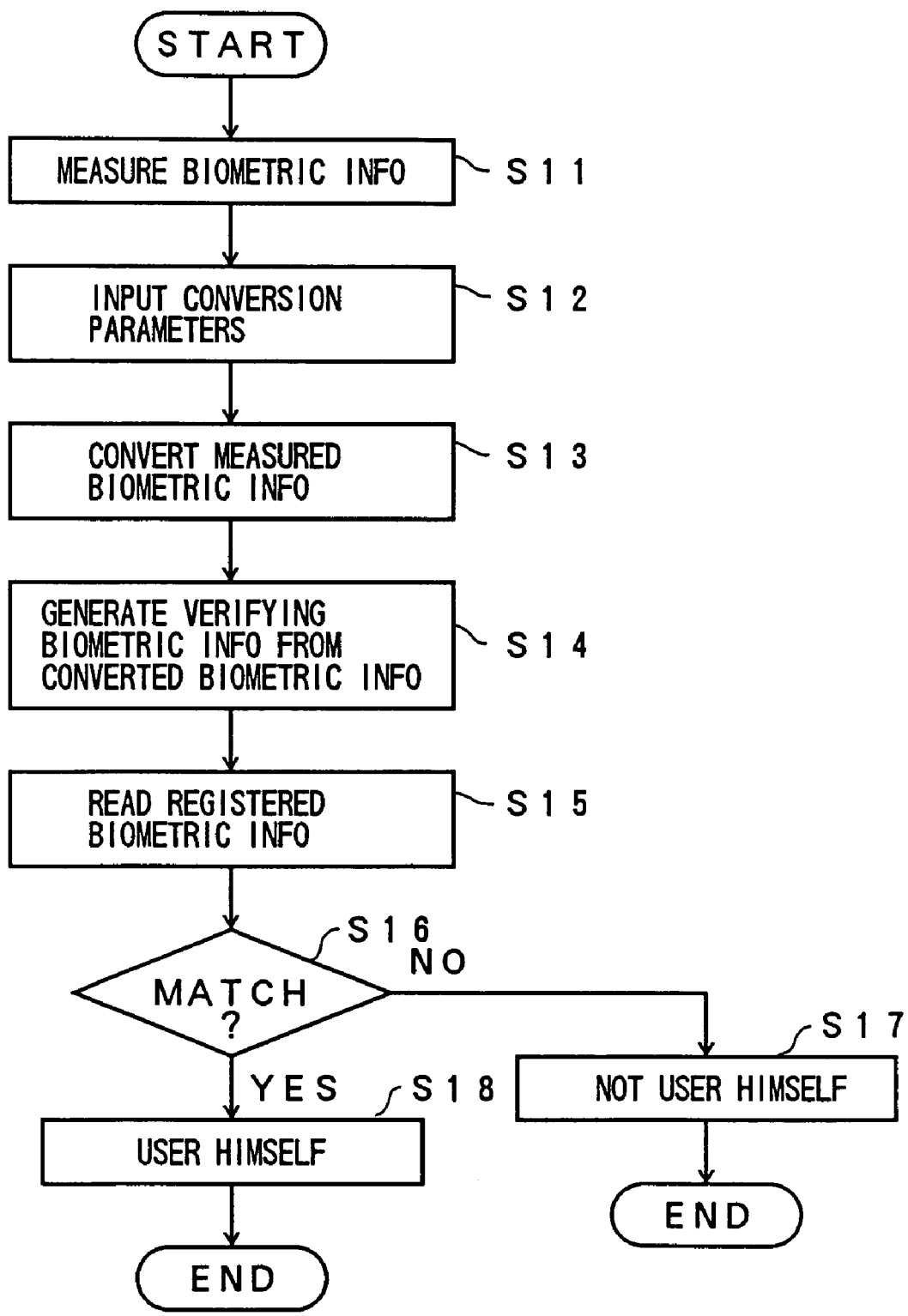
FIG. 6 is a flow chart for explaining the operation of the first embodiment of the authentication apparatus when verifying the biometric information.

FIGS. 5 and 6 respectively are flow charts for explaining processes carried out by the computer system 100 shown in FIGS. 3 and 4 in this embodiment. FIG. 5 shows the process when registering the biometric information, and FIG. 6 shows the process when verifying the biometric information. A first embodiment of the storage medium according to the present invention is formed by a computer-readable storage medium such as the disk 110, for example, which stores a program for causing the computer system 100 to carry out the processes shown in FIGS. 5 and 6.

In FIG. 5, a step S1 measures the biometric information of the user. More particularly, the biometric information of the user input from the biometric information input unit 120 is input. A step S2 inputs the conversion parameters which are input from the keyboard 103 or the like. For example, the conversion parameters include personal information related to the individual user, such as the user's identification (ID) number, name and employee number. A step S3 converts the measured biometric information into converted biometric information based on the conversion parameters, by carrying out a predetermined conversion process. A step S4 generates registering biometric information from the converted biometric information, and registers the user's biometric information by storing the registering biometric information into the memory 132 or the like as registered biometric information.

On the other hand, in FIG. 6, a step S11 measures the biometric information of an individual who is to be authenticated. More particularly, the biometric information of the individual is input from the biometric information input unit 120. A step S12 inputs the conversion parameters which are input from the keyboard 103 or the like. The conversion parameters are the same as the conversion parameters input in the step S2 shown in FIG. 5. A step S13 converts the measured biometric information into converted biometric information based on the conversion parameters, by carrying out a process identical to the predetermined conversion process carried out in the step S3 shown in FIG. 5. A step S14 generates verifying biometric information from the converted biometric information. A step S15 reads from the memory 132 the registered biometric information which is stored in the memory 132 when registering the biometric information as described above.

A step S16 verifies the verifying biometric information with the registered biometric information, and decides whether or not a match exists under a predetermined condition, that is, whether or not an approximate match exists within a predetermined tolerable range. If the decision result in the step S16 is NO, a step S17 judges that the individual subjected to the authentication is not the registered user himself, and an identification result indicating that the individual is not the registered user himself is output. The process ends after the step S17. On the other hand, if the decision result in the step S16 is YES, a step S18 judges that the individual subjected to the authentication is the registered user himself, and an identification result indicating the individual is the registered user himself is output. The process ends after the step S18.

In the steps S3 and S4 shown in FIG. 5 and in the steps S13 and S14 shown in FIG. 6, it is possible to generate the registering biometric information and the verifying biometric information by converting the biometric information itself and then extracting the feature information from the converted biometric information or, by extracting the feature information from the biometric information and then converting the extracted feature information.

In this embodiment, the input biometric information is first converted and then registered. For this reason, it is difficult to infer or estimate the original biometric information from the registered biometric information. Hence, even if the registered biometric information should leak to a third party for same reason, it is difficult for the third party to find out the original biometric information of the registered user from the registered biometric information, and as a result, the leak of privacy information is prevented.

Figure 7:
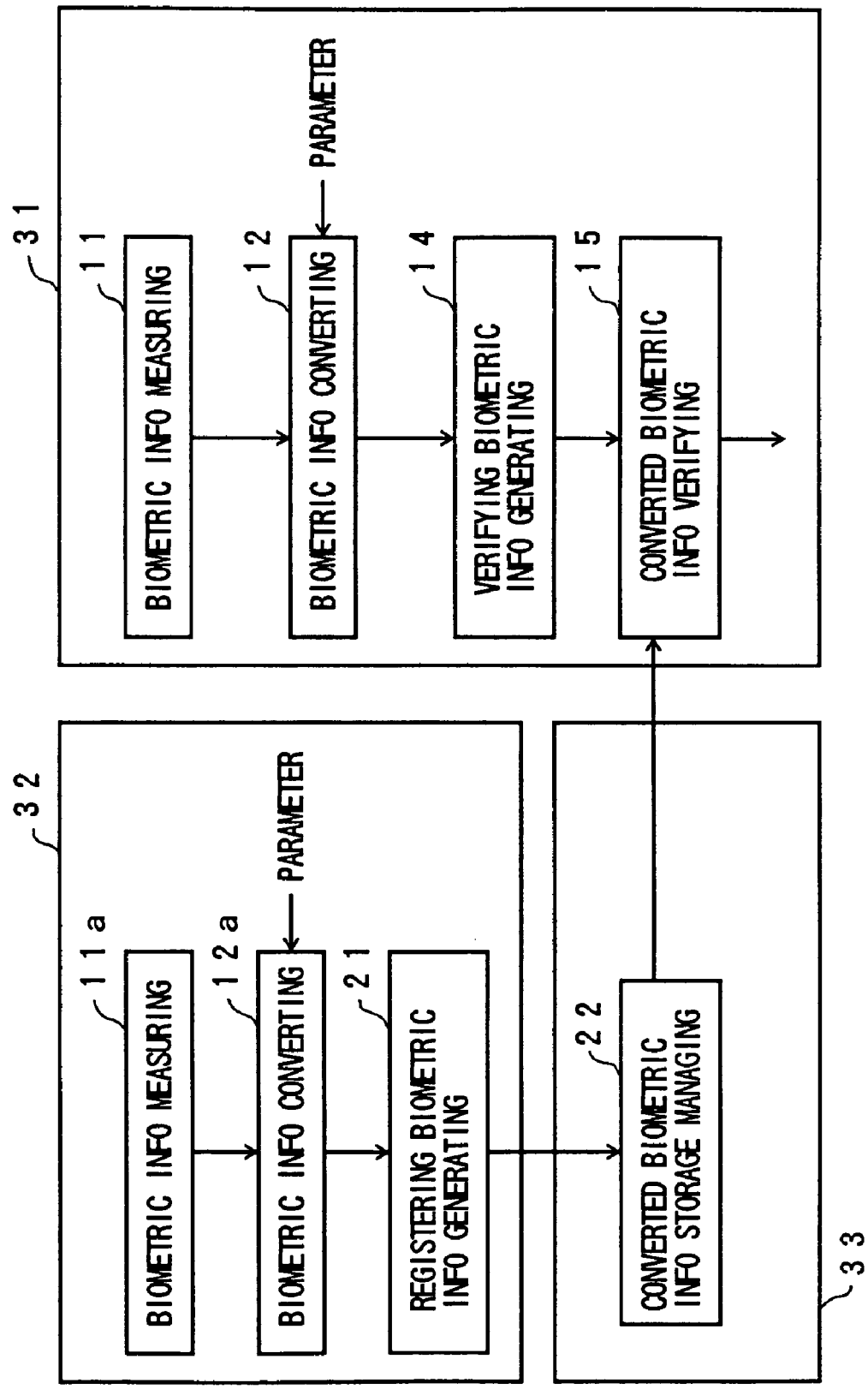
FIG. 7 is a system block diagram showing a second embodiment of the authentication apparatus according to the present invention.

Next, a description will be given of a second embodiment of the authentication apparatus according to the present invention, by referring to FIG. 7. FIG. 7 is a system block diagram showing the second embodiment of the authentication apparatus. In FIG. 7, those parts which are the same as those corresponding parts in FIG. 2 are designated by the same reference numerals, and a description thereof will be omitted. Further, the illustration of the conversion parameter input unit is omitted in FIG. 7.

In this embodiment, an identity authenticating unit 31, a biometric information registering unit 32 and a medium 33 are provided independently. The identity authenticating unit 31 includes the biometric information measuring unit 11, the biometric information converting unit 12, the conversion parameter input unit (not shown), the verifying biometric information generating unit 14 and the converted biometric information verifying unit 15 shown in FIG. 2, and is formed by the computer system 100 described above in conjunction with FIGS. 3 and 4, for example. The biometric information registering unit 32 includes a biometric information measuring unit 11a, a biometric information converting unit 12a and a conversion parameter input unit (not shown) which are similar to the biometric information measuring unit 11, the biometric information converting unit 12 and the conversion parameter input unit 13 shown in FIG. 2, and is formed by the computer system 100 described above in conjunction with FIGS. 3 and 4, for example. The medium 33 includes the converted biometric information storage managing unit 22 shown in FIG. 2, and is formed by the disk 110 shown in FIG. 3, for example.

When registering the biometric information, the biometric information registering unit 32 registers in advance the registering biometric information of the user in the converted biometric information storage managing unit 22 of the medium 33. When verifying the biometric information, the identity authenticating unit 31 verifies the verifying biometric information from the verifying biometric information generating unit 14 with the registered biometric information read from the converted biometric information storage managing unit 22 of the medium 33, and carries out the authentication based on whether or not the verifying biometric information matches the registered biometric information under a predetermined condition.

When an identification result indicating that the individual subjected to the authentication is the user himself is output from the converted biometric information verifying unit 15, a data access, approval, transfer, payment or the like on a computer network, for example, is permitted based on the authentication result. Particular examples of the operations permitted to the individual who is subjected to the authentication, based on the authentication result, are a data transfer between the computer system 100 which forms the identity authenticating unit 31 and the medium 33, an access to information other than the registered biometric information stored in the medium 33, a use of the computer system 100 itself, and a data access on a computer network using the computer system 100.

The conversion parameters used by the biometric information converting unit 12 of the identity authenticating unit 31 may be stored in the medium 33 and read from the medium when the conversion parameters are used, such as when converting the biometric information.

A second embodiment of the storage medium according to the present invention stores a program for causing the computer system 100 to carry out the process of at least one of the identity authenticating unit 31 and the biometric information registering unit 32.

Figure 8:
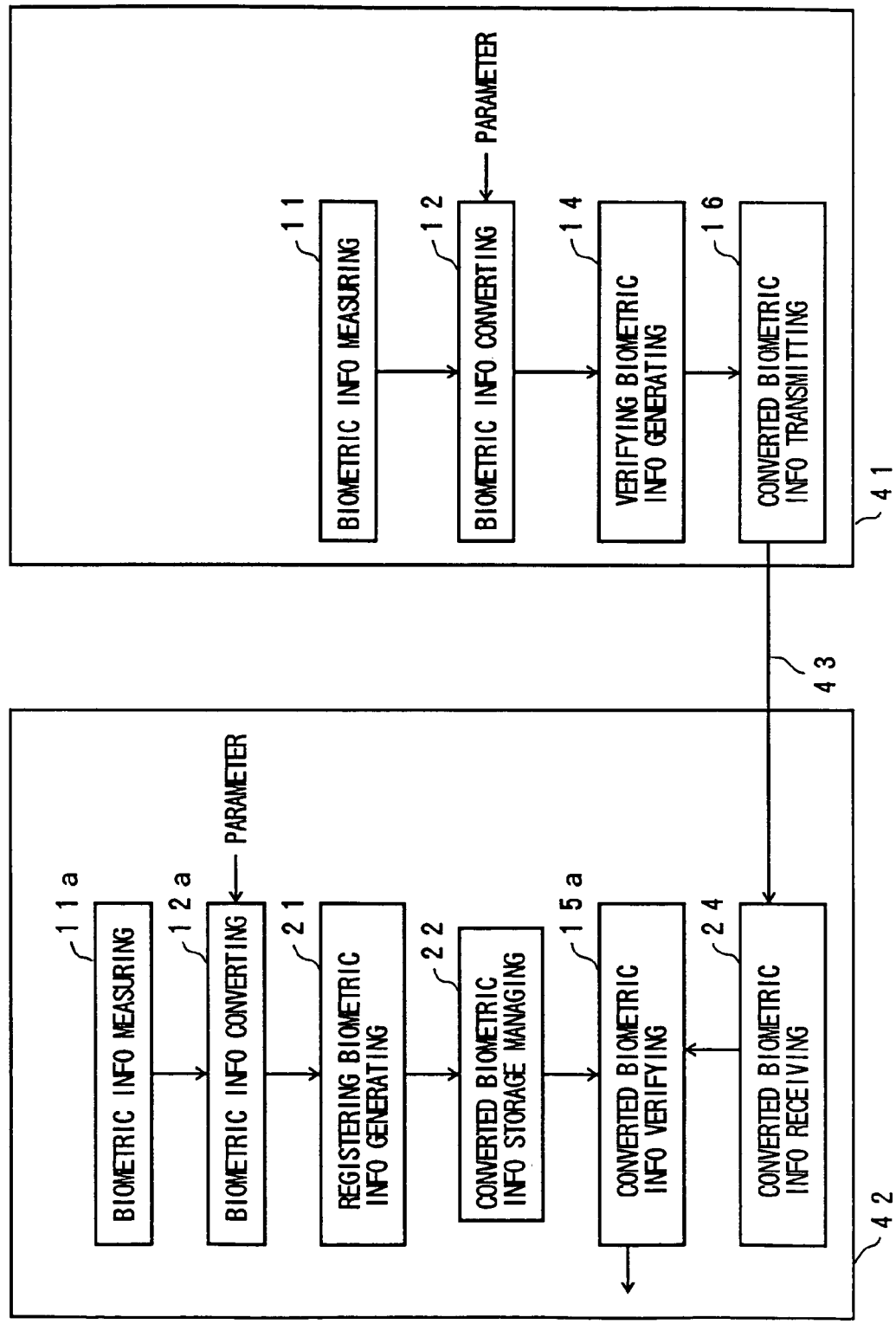
FIG. 8 is a system block diagram showing a third embodiment of the authentication apparatus according to the present invention.

Next, a description will be given of a third embodiment of the authentication apparatus according to the present invention, by referring to FIG. 8. FIG. 8 is a system block diagram showing the third embodiment of the authentication apparatus. In FIG. 8, those parts which are the same as those corresponding parts in FIGS. 2 and 7 are designated by the same reference numerals, and a description thereof will be omitted. Further, the illustration of the conversion parameter input unit is omitted in FIG. 8. In this embodiment, the present invention is applied to a client-server type authentication apparatus.

In this embodiment, a client system 41 and a server system 42 are coupled via a network 43.

The client system 41 includes the biometric information measuring unit 11, the biometric information converting unit 12, the conversion parameter input unit (not shown) and the verifying biometric information generating unit 14 shown in FIG. 2, and a converted biometric information transmitting unit 16. For example, this client system 41 is formed by the computer system 100 described above in conjunction with FIGS. 3 and 4.

On the other hand, the server system 42 includes the biometric information measuring unit 11a, the biometric information converting unit 12a, the conversion parameter input unit (not shown) and the registering biometric information generating unit 21 shown in FIG. 7, the converted biometric information storage managing unit 22, a converted biometric information verifying unit 15a similar to the converted biometric information verifying unit 15 shown in FIG. 2, and a converted biometric information receiving unit 24. For example, this server system 42 is formed by the computer system 100 described above in conjunction with FIGS. 3 and 4. The converted biometric information transmitting unit 16 and the converted biometric information receiving unit 24 respectively include a communication means for making a communication via the network 43.

When registering the biometric information, the registering biometric information is registered in the converted biometric information storage managing unit 22 within the server system 42. When verifying the biometric information, the verifying biometric information obtained from the verifying biometric information generating unit 14 within the client system 41 is transmitted from the converted biometric information transmitting unit 24 within the server system 42 to the converted biometric information receiving unit 24 within the server system 42 via the network 43. The verifying biometric information received by the converted biometric information receiving unit 24 is supplied to the converted biometric information verifying unit 15a within the server system 42, and is verified with respect to the registered biometric information read from the converted biometric information storage managing unit 22 within the server system 42. An authentication result output from the converted biometric information verifying unit 15a within the server system 42 is notified to the client system 41 via the network 43, for example. As a result, the individual subjected to the authentication is permitted to make an access from the client system 41 to a database within the server system 42 via the network 43, for example.

The conversion parameters used by the biometric information converting unit 12a within the server system 42 may be transmitted from the client system 41 via the network 43. In this case, it is unnecessary to provide a conversion parameter input unit in the server system 41. In addition, the conversion parameters used by the biometric information converting unit 12 within the client system 41 may be transmitted from the server system 42 via the network 43. In this case, it is unnecessary to provide a conversion parameter input unit in the client system 42. Furthermore, the conversion parameters transmitted via the network 43 are not limited to the personal information, and may be an enciphering key which is used for the communication via the network 43.

In this embodiment, the registration and verification of the biometric information are carried out in the server system 42. For this reason, it is unnecessary to provide a storage unit having a large capacity in the client system 41 for the purposes of storing the registered biometric information. In addition, the registered biometric information registered within the server system 42 is not the original biometric information of each user, but is the converted biometric information, thereby making it difficult to infer or estimate the original biometric information from the registered biometric information. Accordingly, even if the registered biometric information should leak to a third party for some reason, it is difficult for the third party to find out the original biometric information of the registered user from the registered biometric information, and as a result, the leak of privacy information is prevented.

Furthermore, the verifying biometric information which is transmitted from the client system 41 to the server system 42 via the network 43 is not the original biometric information of the individual who is to be subjected to the authentication, but is the converted biometric information, thereby making it difficult to infer or estimate the original biometric information from the verifying biometric information. Thus, even if the verifying biometric information should leak to a third party for some reason, it is difficult for the third party to find out the original biometric information of the individual who is to be subjected to the authentication from the verifying biometric information, and therefore, the leak of privacy information is prevented.

Figure 9:
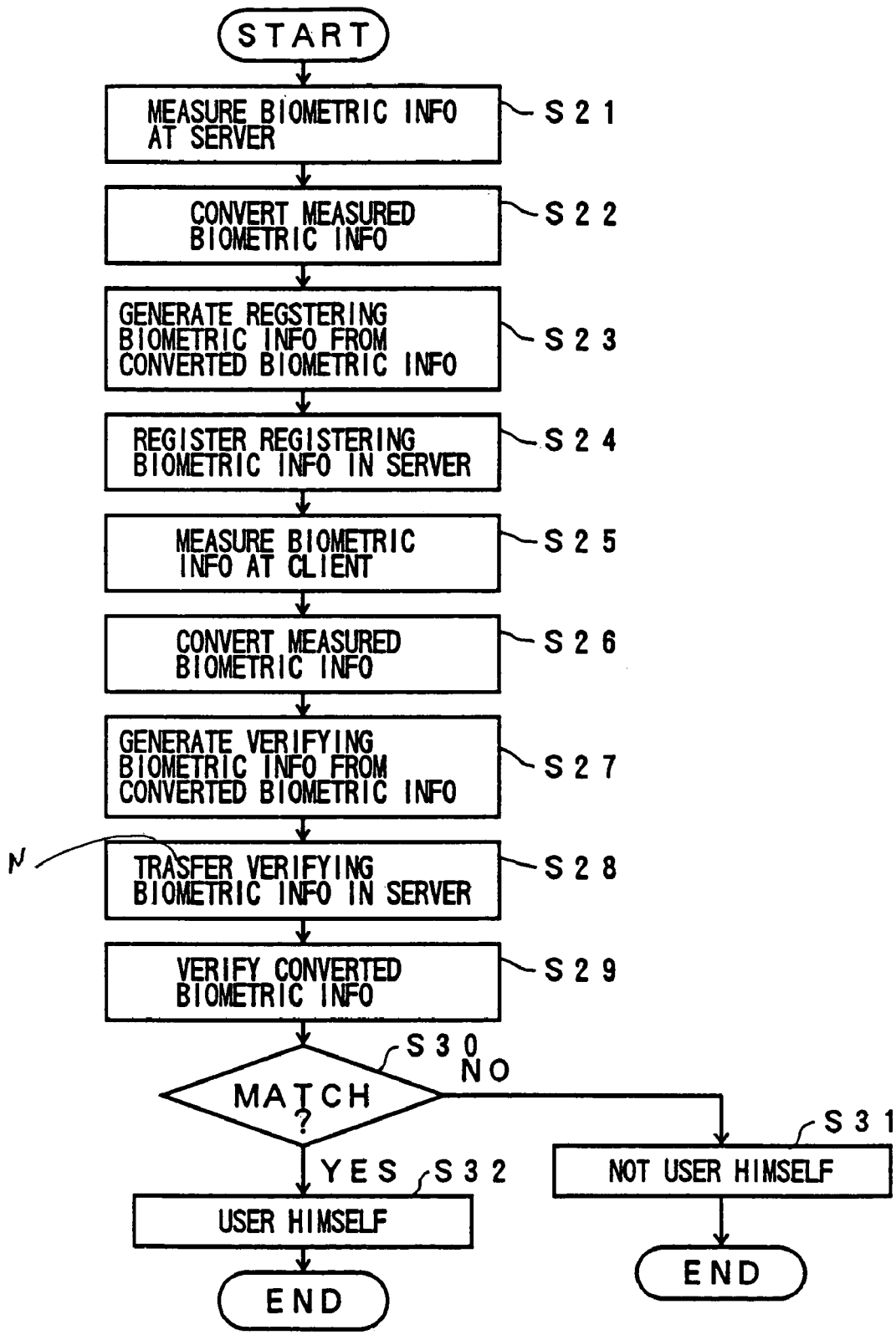
FIG. 9 is a flow chart for explaining the operation of the third embodiment of the authentication apparatus.

FIG. 9 is a flow chart for explaining the process of a computer system which includes the client system 41 and the server system 42 which are coupled via the network 43.

In the server system 42, a step S21 shown in FIG. 9 measures the biometric information of the user. More particularly, the biometric information of the user input from the biometric information input unit 120 of the computer system 100 which forms the server system 42 is input. A step S22 converts the measured biometric information by a predetermined conversion process based on the conversion parameters input from the keyboard 103 or the like or, the conversion parameters notified from the client system 41 via the network 43. A step S23 generates the registering biometric information from the converted biometric information, and a step S24 registers the biometric information of the user by storing the registering biometric information in the memory 132 or the like as the registered biometric information.

On the other hand, in the client system 41, a step S25 measures the biometric information of the individual who is to be subjected to the authentication. More particularly, the biometric information of the individual who is to be subjected to the authentication is input from the biometric information input unit 120 of the computer system 100 which forms the client system 41 is input. A step S26 converts the measured biometric information by a conversion process identical to the predetermined process carried out in the step S22, based on the conversion parameters identical to the conversion parameters used in the step S22. A step S27 generates the verifying biometric information from the converted biometric information. A step S28 transmits the verifying biometric information to the server system 42 via the network 43.

In the server system 42 which receives the verifying biometric information, a step S29 reads the registered biometric information which is registered at the time of the biometric information registration, from the memory 132 of the computer system 100 which forms the server system 42, and verifies the received verifying biometric information with respect to the registered biometric information. A step S30 decides whether or not the verifying biometric information matches the registered biometric information under a predetermined condition, that is, whether or not an approximate match exists within a predetermined tolerable range. If the decision result in the step S30 is NO, a step S31 judges that the individual subjected to the authentication is not the registered user himself, and an identification result indicating that the individual is not the registered user himself is output. The process ends after the step S31. On the other hand, if the decision result in the step S30 is YES, a step S32 judges that the individual subjected to the authentication is the registered user himself, and an identification result indicating the individual is the registered user himself is output. The process ends after the step S32.

In the steps S22 and S23 and in the steps S26 and S27 shown in FIG. 9, it is possible to generate the registering biometric information and the verifying biometric information by converting the biometric information itself and then extracting the feature information from the converted biometric information or, by extracting the feature information from the biometric information and then converting the extracted feature information.

A third embodiment of the storage medium according to the present invention stores a program for causing the computer system 100 to carry out the process of at least one of the client system 41 and the server system 42.

Figure 10:
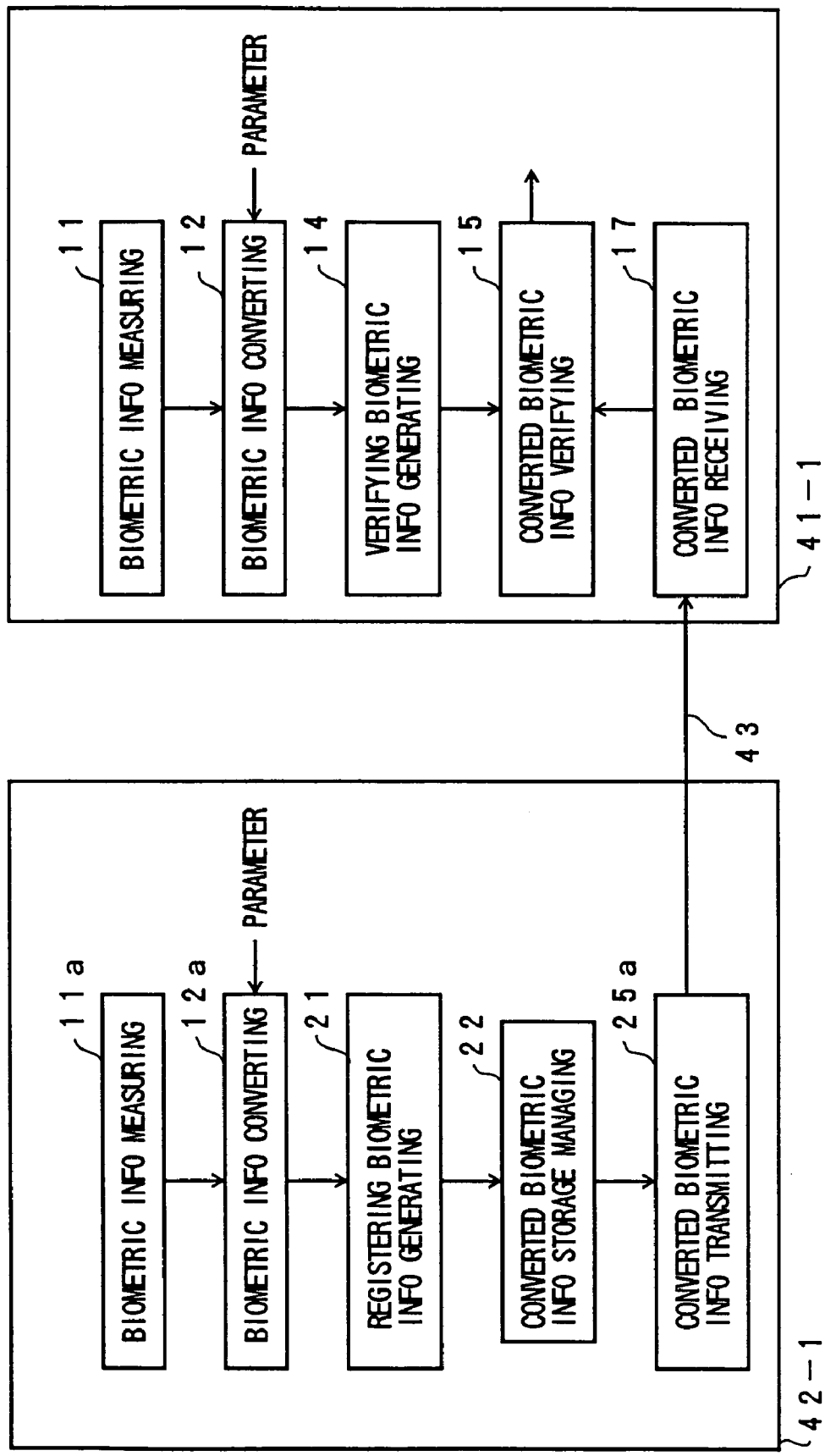
FIG. 10 is a system block diagram showing a fourth embodiment of the authentication apparatus according to the present invention.

Next, a description will be given of a fourth embodiment of the authentication apparatus according to the present invention, by referring to FIG. 10. FIG. 10 is a system block diagram showing the fourth embodiment of the authentication apparatus. In FIG. 10, those parts which are the same as those corresponding parts in FIGS. 2 and 8 are designated by the same reference numerals, and a description thereof will be omitted. Further, the illustration of the conversion parameter input unit is omitted in FIG. 10. In this embodiment, the present invention is applied to a client-server type authentication apparatus.

In this embodiment, a client system 41-1 includes the biometric information measuring unit 11, the biometric information converting unit 12, the conversion parameter input unit (not shown), the verifying biometric information generating unit 14, the converted biometric information verifying unit 15, and the converted biometric information receiving unit 17. For example, this client system 41-1 is formed by the computer system 100 described above in conjunction with FIGS. 3 and 4.

On the other hand, a server system 42-1 includes the biometric information measuring unit 11a, the biometric information converting unit 12a, the conversion parameter input unit (not shown), the registering biometric information generating unit 21, the converted biometric information storage managing unit 22, and a converted biometric information transmitting unit 25a. For example, this server system 42-1 is formed by the computer system 100 described above in conjunction with FIGS. 3 and 4. The converted biometric information transmitting unit 25a and the converted biometric information receiving unit 17 respectively include a communication means for making a communication via the network 43.

When registering the biometric information, the registering biometric information is registered in the converted biometric information storage managing unit 22 within the server system 42-1. When verifying the biometric information, the registered biometric information read from the converted biometric information storage managing unit 22 within the server system 42-1 is transmitted from the converted biometric information transmitting unit 25a within the server system 42-1 to the converted biometric information receiving unit 17 within the client system 41-1 via the network 43. The verifying biometric information received by the converted biometric information receiving unit 17 is supplied to the converted biometric information verifying unit 15 within the client system 41-1, and is verified with respect to the verifying biometric information obtained from the verifying biometric information generating unit 14 within the client system 41-1. Based on an authentication result output from the converted biometric information verifying unit 15 within the client system 41-1 the individual subjected to the authentication is permitted to make an access from the client system 41-1 to a database within the server system 42-1 via the network 43, for example.

The conversion parameters used by the biometric information converting unit 12a within the server system 42-1 may be transmitted from the client system 41-1 to the server system 42-1 via the network 43. In this case, it is unnecessary to provide a conversion parameter input unit in the server system 42-1. In addition, the conversion parameters used by the biometric information converting unit 12 within the client system 41-1 may be transmitted from the server system 42-1 to the client system 41-1 via the network 43. In this case, it is unnecessary to provide a conversion parameter input unit in the client system 41-1. Furthermore, the conversion parameters transmitted via the network 43 are not limited to the personal information, and may be an enciphering key which is used for the communication via the network 43.

In this embodiment, the registration of the biometric information is carried out in the server system 42-1, and the verification of the biometric information is carried out in the client system 41-1. For this reason, it is unnecessary to provide a storage unit having a large capacity in the client system 41-1 for the purposes of storing the registered biometric information. In addition, the registered biometric information registered within the server system 42-1 is not the original biometric information of each user, but is the converted biometric information, thereby making it difficult to infer or estimate the original biometric information from the registered biometrid information. Accordingly, even if the registered biometric information should leak to a third party for some reason, it is difficult for the third party to find out the original biometric information of the registered user from the registered biometric information, and as a result, the leak of privacy information is prevented.

Figure 11:
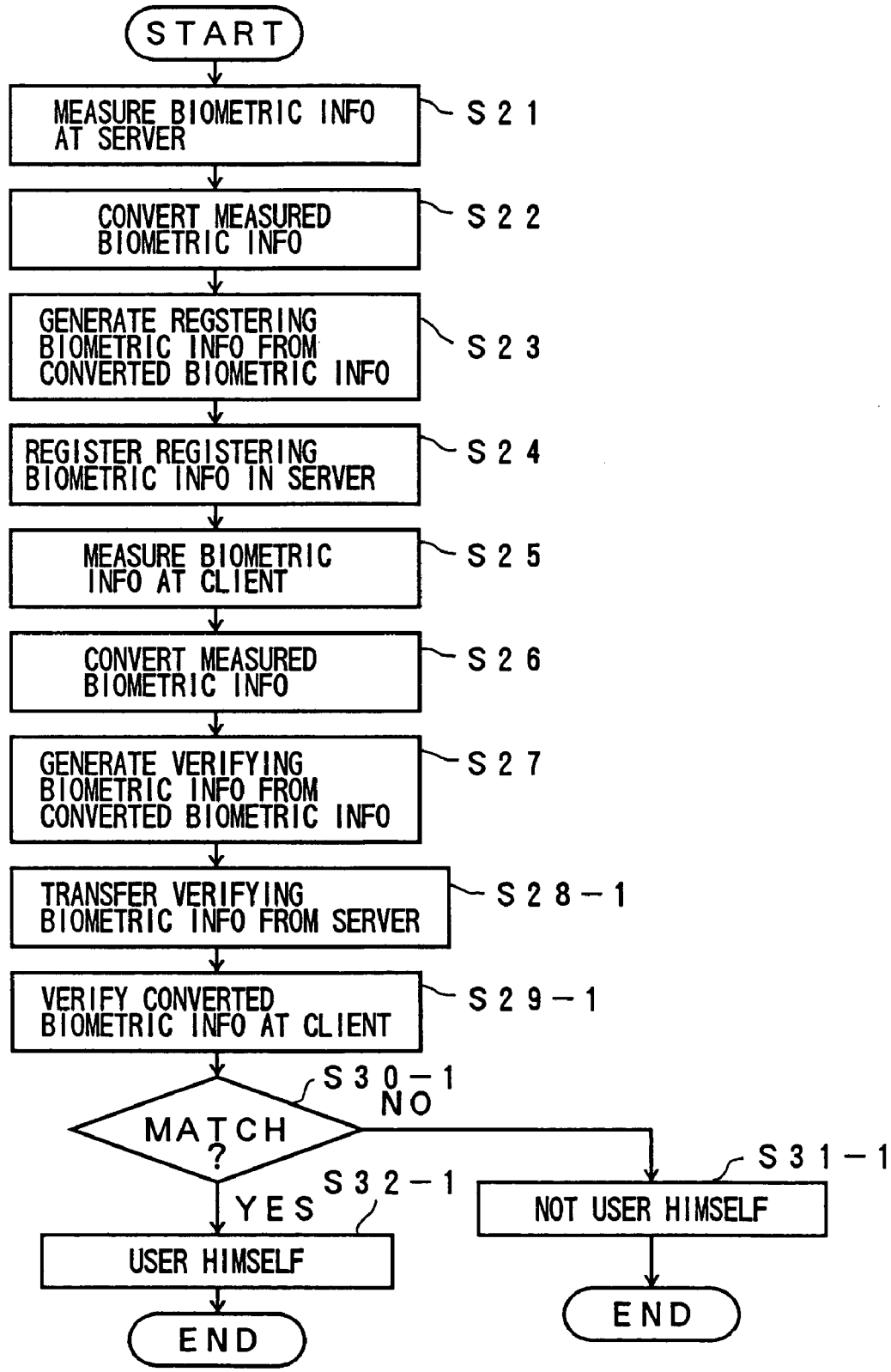
FIG. 11 is a flow chart for explaining the operation of the fourth embodiment of the authentication apparatus.

FIG. 11 is a flow chart for explaining the process of a computer system which includes the client system 41-1 and the server system 42-1 which are coupled via the network 43. In FIG. 11, those steps which are the same as those corresponding steps in FIG. 9 are designated by the same reference numerals, and a description thereof will be omitted.

In the server system 42-1, the steps S21 through S24 shown in FIG. 11 store the registering biometric information in the memory 132 or the like as the registered biometric information, so as to register the biometric information of the user. On the other hand, in the client system 41-1, the steps S25 through S27 generate the verifying biometric information. Then, in the server system 42-1, a step S28-1 transmits the registered biometric information to the client system 41-1 via the network 43.

In the client system 41-1 which receives the verifying biometric information, a step S29-1 verifies the verifying biometric information with respect to the registered verifying biometric information received from the server system 42-1. A step S30-1 decides whether or not the verifying biometric information matches the registered biometric information under a predetermined condition, that is, whether or not an approximate match exists within a predetermined tolerable range. If the decision result in the step S30-1 is NO, a step S31-1 judges that the individual subjected to the authentication is not the registered user himself, and an identification result indicating that the individual is not the registered user himself is output. The process ends after the step S31-1. On the other hand, if the decision result in the step S30-1 is YES, a step S32-1 judges that the individual subjected to the authentication is the registered user himself, and an identification result indicating the individual is the registered user himself is output. The process ends after the step S32-1.

A fourth embodiment of the storage medium according to the present invention stores a program for causing the computer system 100 to carry out the process of at least one of the client system 41-1 and the server system 42-1.

Figure 12:
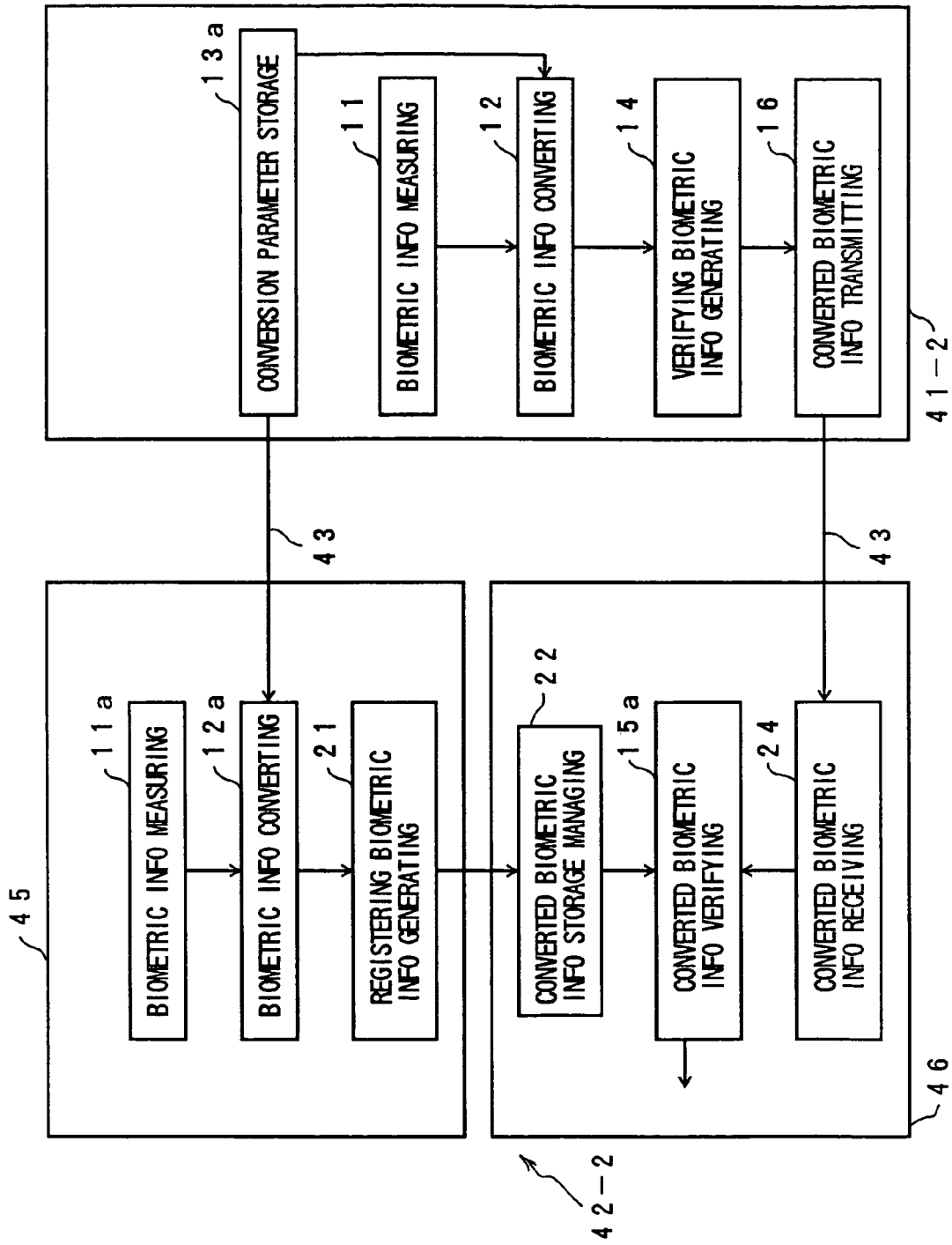
FIG. 12 is a system block diagram showing a fifth embodiment of the authentication apparatus according to the present invention.

Next, a description will be given of a fifth embodiment of the authentication apparatus according to the present invention, by referring to FIG. 12. FIG. 12 is a system block diagram showing the fifth embodiment of the authentication apparatus. In FIG. 12, those parts which are the same as those corresponding parts in FIGS. 2 and 8 are designated by the same reference numerals, and a description thereof will be omitted. In this embodiment, the present invention is applied to a client-server type authentication apparatus.

In this embodiment, a client system 41-2 includes the biometric information measuring unit 11, the biometric information converting unit 12, a conversion parameter storage unit 13a, the verifying biometric information generating unit 14, and the converted biometric information transmitting unit 16. For example, this client system 41-2 is formed by the computer system 100 described above in conjunction with FIGS. 3 and 4. On the other hand, a server system 42-2 includes a registering unit 45 and a verifying unit 46. In this embodiment, the registering unit 45 and the verifying unit 46 are independent units which are operated by different operators, for example.

The registering unit 45 includes the biometric information measuring unit 11a, the biometric information converting unit 12a and the registering biometric information generating unit 21. For example, the registering unit is formed by the computer system 100 described above in conjunction with FIGS. 3 and 4.

The verifying unit 46 includes the converted biometric information storage managing unit 22, the converted biometric information verifying unit 15a and the converted biometric information receiving unit 24. For example, the verifying unit is formed by the computer system 100 described above in conjunction with FIGS. 3 and 4.

The converted biometric information transmitting unit 16 and the converted biometric information receiving unit 24 respectively include a communication means for carrying out a communication via the network 43.

When registering the biometric information, the registering biometric information is generated in the registering unit 45 of the server system 42-2, and registered in the converted biometric information storage managing unit 22 within the verifying unit 46 of the server system 42-2. The conversion parameters which are obtained from the conversion parameter storage unit 13a of the client system 41-2 via the network 43, when converting the biometric information in the biometric information converting unit 12a.

When verifying the biometric information, the registered biometric information read from the converted biometric information storage managing unit 22 in the verifying unit 46 of the server system 42-2 is supplied to the converted biometric information verifying unit 15a. In addition, the verifying biometric information is transmitted from the converted biometric information transmitting unit 16 of the client system 41-2 to the converted biometric information receiving unit 24 of the server system 42-2 via the network 43. The verifying biometric information received by the converted biometric information receiving unit 24 is supplied to the converted biometric information verifying unit 15a, and is verified with respect to the registered biometric information. Based on an authentication result output from the converted biometric information verifying unit 15a within the server system 42-2 the individual subjected to the authentication is permitted to make an access from the client system 41-2 to a database within the server system 42-2 via the network 43, for example.

The conversion parameters transmitted via the network 43 are not limited to the personal information, and may be an enciphering key which is used for the communication via the network 43.

In this embodiment, the registration of the biometric information is carried out in the registering unit 45 of the server system 42-2, and the verification of the biometric information is carried out in the verifying unit 46 of the server system 42-2. For this reason, it is unnecessary to provide a storage unit having a large capacity in the client system 41-2 for the purposes of storing the registered biometric information. In addition, the registered biometric information registered within the verifying unit 46 of the server system 42-2 is not the original biometric information of each user. Furthermore, the conversion parameters obtained via the network 43 and the biometric information converting unit 12a are obtained only within the registering unit 45 of the server system 42-2, and are not visible from the verifying unit 46. Therefore, it difficult to infer or estimate the original biometric information from the registered biometric information. Moreover, it is impossible to infer or estimate the original biometric information in the verifying unit 46. Accordingly, even if the registered biometric information should leak to a third party for some reason, it is difficult for the third party to find out the original biometric information of the registered user from the registered biometric information, and as a result, the leak of privacy information is prevented.

Figure 13:
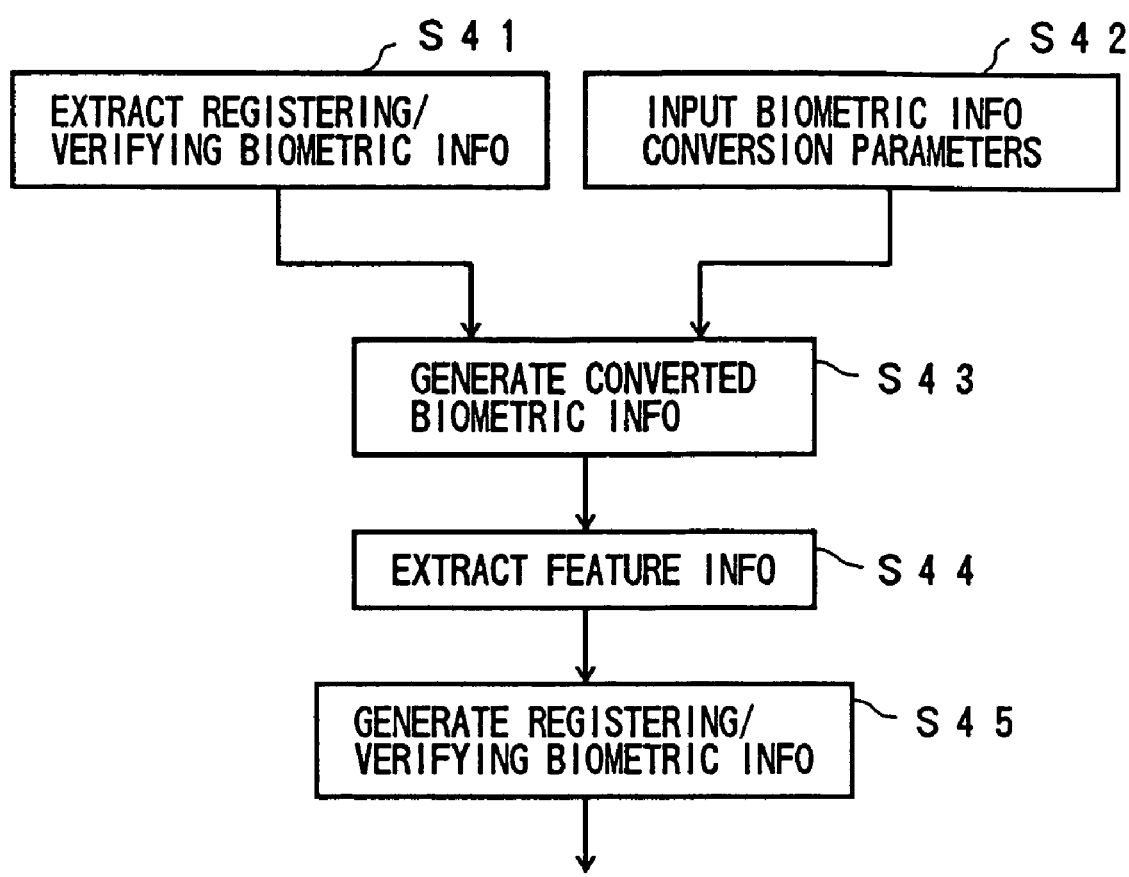
FIG. 13 is a flow chart for explaining the operation of the fifth embodiment of the authentication apparatus.

FIG. 13 is a flow chart for explaining an important part of the process of a computer system which includes the client system 41-1 and the server system 42-1 which are coupled via the network 43.

In FIG. 13, in the case of the process of the server system 42-2, a step S41 extracts the registering biometric information, and parallel to the step S41, a step S42 inputs the biometric information conversion parameters from the client system 41-2. A step S43 converts the extracted registering biometric information based on the biometric information conversion parameters obtained from the client system 41-2. A step S44 extracts the feature information from the converted biometric information, and a step S45 registers the extracted feature information as the registered biometric information.

On the other hand in FIG. 13, in the case of the process of the client system 41-2, the step S41 extracts the verifying biometric information, and in parallel to the step S41, the step S42 inputs the biometric information conversion parameters. The step S43 converts the extracted verifying biometric information based on the biometric information conversion parameters obtained from the client system 41-2. The step S44 extracts the feature information from the converted biometric information, and the step S45 regards the extracted feature information as the verifying biometric information.

The verification of the verifying biometric information with respect to the registered biometric information is carried out similarly as in the embodiment described above, and the authentication is carried out as a result.

In FIG. 13, it is possible to carry out the steps S43 and S44 in a reverse order to that shown. In other words, it is possible to extract the feature information from the biometric information first in the step S44, and then carry out the conversion process in the step S43.

Next, a description will be given of the conversion process which converts the biometric information. FIGS. 14A through 17B respectively are diagrams for explaining embodiments of the conversion process, for a case where the biometric information is a fingerprint image related to a fingerprint.

Figure 14A:
FIGS. 14A and 14B respectively are diagrams for explaining an embodiment of a conversion process.
Figure 14B:

FIGS. 14A and 14B are diagrams for explaining an expansion process in a horizontal direction of the fingerprint image. FIG. 14A shows an extracted fingerprint image, and FIG. 14B shows a converted fingerprint image which is reduced in only the vertical direction by the expansion process in the horizontal direction.

Figure 15A:
FIGS. 15A and 15B respectively are diagrams for explaining an embodiment of the conversion process.
Figure 15B:
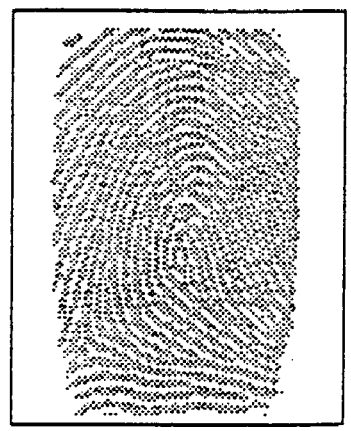

FIGS. 15A and 15B are diagrams for explaining an expansion process in a vertical direction of the fingerprint image. FIG. 15A shows an extracted fingerprint image, and FIG. 15B shows a converted fingerprint image which is reduced in only the horizontal direction by the expansion process in the vertical direction.

In FIGS. 14A, 14B, 15A and 15B, the expansion process is carried out isotropically. However, it is possible to carry out the expansion process non-isotropically, so as to make the original fingerprint image before the conversion even more difficult to infer or estimate.

Figure 16A:
FIGS. 16A and 16B respectively are diagrams for explaining an embodiment of the conversion process.
Figure 16B:

FIGS. 16A and 16B are diagrams for explaining a mirror process with respect to the fingerprint image. FIG. 16A shows an extracted fingerprint image, and FIG. 16B shows a converted fingerprint image having the right and left sides of the original fingerprint image reversed by the mirror process.

Figure 17A:
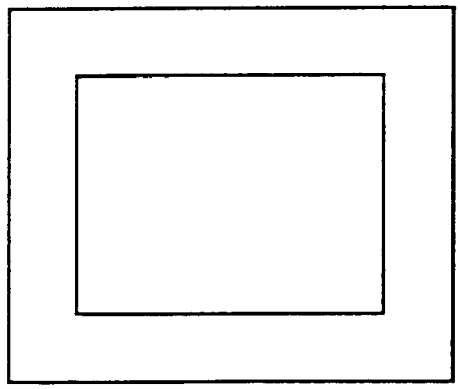
FIGS. 17A and 17B respectively are diagrams for explaining an embodiment of the conversion process.
Figure 17B:
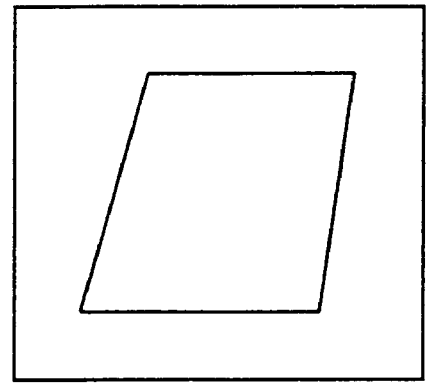

FIGS. 17A and 17B are diagrams for explaining an affine conversion process with respect to the fingerprint image. FIG. 17A shows an extracted fingerprint image, and FIG. 17B shows a converted fingerprint image which is converted by the affine conversion process. For the sake of convenience, FIGS. 17A and 17B only show the contour of the fingerprint image.

When verifying the fingerprint, the position coordinate of the feature point such as the end point and the branch point, crest direction, center of the fingerprint, and the like are used. For this reason, if the format of the registered finger print information is known, it is possible to infer or estimate the original fingerprint information by taking into consideration the fluctuation of the fingerprint information introduced at the time of the measurement. However, by carrying out the conversion process described above, it becomes extremely difficult to infer or estimate the original fingerprint information before the conversion by inferring or estimating the position coordinate, the crest direction, the center of the fingerprint and the like of the original fingerprint image.

FIG. 18 is a flow chart for explaining the conversion process described above in conjunction with FIGS. 14A through 17B. The conversion process shown in FIG. 18 is carried out by the computer system 100 or the like.

In FIG. 18, a step S51 extracts a fingerprint image, and a step S52 carries out at least one of the conversion processes described above in conjunction with FIGS. 14A through 17B, with respect to the extracted fingerprint image, so as to obtain a converted fingerprint image. A step S53 extracts feature information from the converted fingerprint image, so as to generate verifying fingerprint image or a registering fingerprint image, and the conversion process ends.

In FIG. 18, the order in which the steps S52 and S53 are carried out may be reversed. In other words, it is possible to extract the feature information from the extracted fingerprint image in the step S53, and then carry out the conversion process with respect to the feature information in the step S52, so as to generate the verifying fingerprint image or the registering fingerprint image.

Figure 19A:
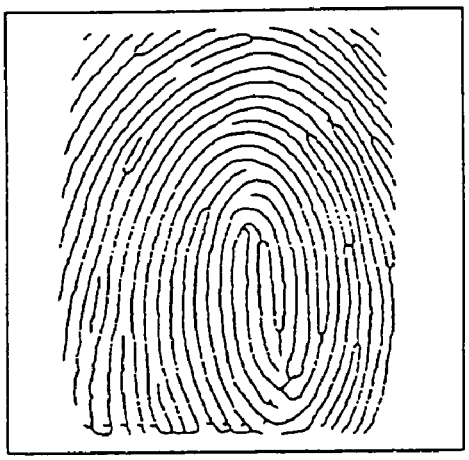
FIGS. 19A and 19B respectively are diagrams for explaining another embodiment of the conversion process.
Figure 19B:
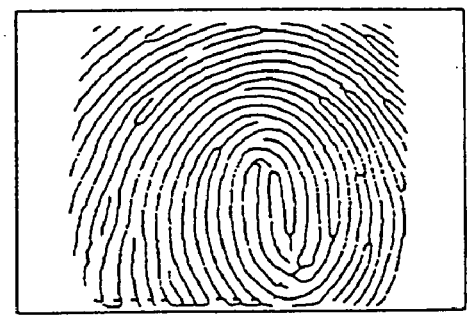

FIGS. 19A and 19B are diagrams for explaining another embodiment of the conversion process with respect to the biometric information, for a case where the biometric information is a fingerprint image related to a fingerprint. FIG. 19A shows a thinned fingerprint image which is obtained by thinning an extracted fingerprint, and FIG. 19B shows a converted fingerprint image which is obtained by subjecting the thinned fingerprint image to an image conversion process.

In this case, the image conversion process is not carried out until the fingerprint image is thinned. For this reason, a general image processing utilizing the characteristics of the fingerprint image may be carried out. In other words, since the image conversion process is carried out after thinning the fingerprint image so as to facilitate the extraction of the feature information, it is possible to easily extract the feature information after the image conversion process.

Figure 20:
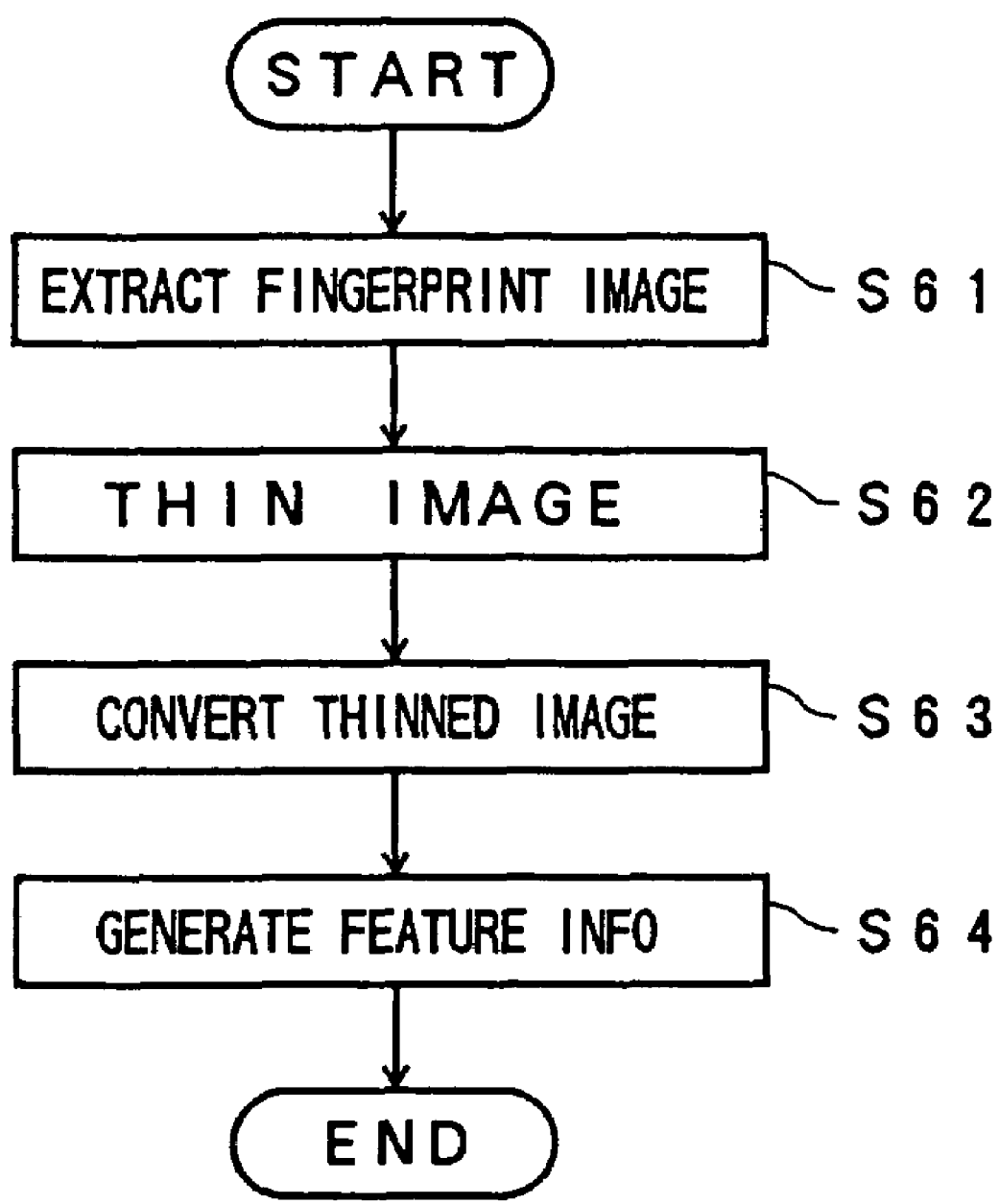
FIG. 20 is a flow chart for explaining the image conversion process.

FIG. 20 is a flow chart for explaining the image conversion process described above in conjunction with FIGS. 19A and 19B. The image conversion process shown in FIG. 20 is carried out by the computer system 100 or the like.

In FIG. 20, a step S61 extracts the fingerprint image, and a step S62 carries out a thinning process with respect to the extracted fingerprint image. A step S63 carries out the image conversion process described above in conjunction with FIGS. 19A and 19B, with respect to the thinned fingerprint image, so as to generate a converted fingerprint image. A step S64 extracts feature information from the converted fingerprint image, so as to generate a verifying fingerprint image or a registering fingerprint image, and the image conversion process ends.

In the embodiments described above, the biometric information used is the fingerprint, but the biometric information is of course not limited to the fingerprint.

In addition, the conversion process may be any one of a linear or non-linear magnification, rotation, reduction and affine conversion. Moreover, the conversion process may be any one of a frequency conversion process, time base conversion process, coordinate transformation process and image conversion process. Furthermore, the conversion process may be any one of a function process, non-linear function process, and unidirectional function process such as the hash function.

The computer system to which the present invention is applied is not limited to a desk-top type shown in FIG. 3, and the computer system may be a portable type such as a lap-top or notebook type computer.

The computer-readable storage medium which stores a program for causing a computer to carry out an authentication of an individual may be provided with a measuring means for causing the computer to measure biometric information of the individual, converting means for causing the computer to carry out a predetermined conversion process with respect to the biometric information so as to obtain converted biometric information, extracting means for causing the computer to extract feature information from the converted biometric information so as to obtain extracted feature information, and a verifying means for causing the computer to verify the extracted feature information with respect to registered information which is registered in advance so as to authenticate the individual. Alternatively, the computer-readable storage medium which stores a program for causing a computer to carry out an authentication of an individual may be provided with a measuring means for causing the computer to measure biometric information of the individual, extracting means for extracting feature information from the biometric information so as to obtain extracted feature information, converting means for causing the computer to carry out a predetermined conversion process with respect to the extracted feature information so as to obtain converted extracted feature information, and a verifying means for causing the computer to verify the converted extracted feature information with respect to registered information which is registered in advance so as to authenticate the individual. In either case, the verifying means may cause the computer to read the registered information from a recording medium.

In this case, the measuring means, the converting means, the extracting means and the verifying means may respectively control a client computer, and the recording medium may be read in a client computer. On the other hand, the measuring means, the converting means, the extracting means and the verifying means may respectively control a client computer, and the recording medium may be read in a server computer which is coupled to the client computer via a network and supplied to the verifying means of the client computer via the network. Furthermore, the measuring means, the converting means and the extracting means may respectively control a client computer, the verifying means may control a server computer which is coupled to the client computer via a network, and the recording medium may be read in the server computer. In these cases, it is possible to apply the present invention to the stand-alone type authentication apparatus and a client-server type authentication apparatus with a high flexibility.

Further, the present invention is not limited to these embodiments, but various variations and modifications may be made without departing from the scope of the present invention.

What is claimed is:

1. An authentication apparatus comprising:
    a measuring part configured to measure biometric information of an individual;
    a converting part configured to carry out a predetermined conversion process with respect to the biometric information so as to obtain converted biometric information;
    an extracting part configured to extract feature information from the converted biometric information so as to obtain extracted feature information;
    a verifying part configured to verify the extracted feature information with respect to registered information which is registered in advance, by comparing the extracted feature information and the registered information, so as to authenticate the individual; and
    an input part configured to input parameters used by said converting part for the predetermined conversion process.

2. The authentication apparatus as claimed in claim 1, wherein said converting part uses personal information related to the individual as the parameters.

3. The authentication apparatus as claimed in claim 1, wherein said verifying part receives the registered information by a communication which is made via a medium, and said converting part uses an enciphering key which is used for the communication as the parameters used for the predetermined conversion process.

4. The authentication apparatus as claimed in claim 1, wherein the registered information is prestored in a recording medium, and said verifying part reads the registered information from the recording medium.

5. The authentication apparatus as claimed in claim 4, wherein said measuring part, said converting part, said extracting part and said verifying part are provided in a client computer, and said recording medium is read in the client computer.

6. The authentication apparatus is claimed in claim 4, wherein said measuring part, said converting part, said extracting part and said verifying part are provided in a client computer, and said recording medium is read in a server computer which is coupled to the client computer via a network and the registered information read from the recording medium is supplied to said verifying part in the client computer via the network.

7. The authentication apparatus as claimed in claim 4, wherein said measuring part, said converting part and said extracting part are provided in a client computer, said verifying part is provided in a server computer which is coupled to the client computer via a network, and said recording medium is read in the server computer.

8. The authentication apparatus as claimed in claim 1, further comprising:
    a registering part configured to store the extracted feature information as the registered information.

9. A computer-readable storage medium which stores a program for causing a computer to authenticate an individual, said program comprising:
    a measuring procedure causing the computer to measure biometric information of an individual;
    a converting procedure causing the computer to carry out a predetermined conversion process with respect to the biometric information so as to obtain converted biometric information;
    an extracting procedure causing the computer to extract feature information from the converted biometric information so as to obtain extracted feature information;

a verifying procedure causing the computer to verify the extracted feature information with respect to registered information which is registered in advance, by comparing the extracted feature information and the registered information, so as to authenticate the individual; and an input procedure causing the computer to input parameters used by said converting procedure for the predetermined conversion process.

10. The computer-readable storage medium as claimed in claim 9, wherein said verifying procedure causes the computer to read the registered information from a recording medium which prestores the registered information.

11. The computer-readable storage medium as claimed in claim 9, wherein said program further comprises:

a registering procedure causing the computer to register the extracted feature information as the registered information.

12. An authentication apparatus comprising:

a measuring part configured to measure biometric information of an individual;

an extracting part configured to extract feature information from the biometric information so as to obtain extracted feature information;

a converting part configured to carry out a predetermined conversion process with respect to the extracted feature information so as to obtain converted extracted feature information;

a verifying part configured to verify the converted extracted feature information with respect to registered information which is registered in advance, by comparing the converted extracted feature information and the registered information, so as to authenticate the individual; and an input part configured to input parameters used by said converting part for the predetermined conversion process.

13. The authentication apparatus as claimed in claim 12, wherein said converting part uses personal information related to the individual as the parameters.

14. The authentication apparatus as claimed in claim 12, wherein said verifying part receives the registered information by a communication which is made via a medium, and said converting part uses an enciphering key which is used for the communication as the parameters used for the predetermined conversion process.

15. The authentication apparatus as claimed in claim 12, wherein the registered information is prestored in a recording medium, and said verifying part reads the registered information from the recording medium.

16. The authentication apparatus as claimed in claim 15, wherein said measuring part, said extracting part, said converting part and said verifying part are provided in a client computer, and said recording medium is read in the client computer.

17. The authentication apparatus as claimed in claim 15, wherein said measuring part, said extracting part, said converting part and said verifying part are provided in a client computer, and said recording medium is read in a server computer which is coupled to the client computer via a network and the registered information read from the recording medium is supplied to said verifying part in the client computer via the network.

18. The authentication apparatus as claimed in claim 15, wherein said measuring part, said extracting part and said converting part are provided in a client computer, said verifying part is provided in a server computer which is coupled to the client computer via a network, and said recording medium is read in the server computer.

19. The authentication apparatus as claimed in claim 12, further comprising:

a registering part configured to register the converted extracted feature information as the registered information.

20. A computer-readable storage medium which stores a program for causing a computer to authenticate an individual, said program comprising:

a measuring procedure causing the computer to measure biometric information of an individually;

an extracting procedure causing the computer to extract feature information from the biometric information so as to obtain extracted feature information;

a converting procedure causing the computer to carry out a predetermined conversion process with respect to the extracted feature information so as to obtain converted extracted feature information; and a verifying procedure causing the computer to verify the converted extracted feature information with respect to registered information which is registered in advance, by comparing the converted extracted feature information and the registered information, so as to authenticate the individual; and an input procedure causing the computer to input parameters used by said converting procedure for the predetermined conversion process.

21. The computer-readable storage medium as claimed in claim 20, wherein said verifying procedure causes the computer to read the registered information from a recording medium which prestores the registered information.

22. The computer-readable storage medium as claimed in claim 20, wherein said program further comprises:

a registering procedure causing the computer to register the converted extracted feature information as the registered information.

23. An authentication apparatus comprising:

a measuring part configured to measure biometric information of an individual;

a converting part configured to carry out a predetermined conversion process with respect to the biometric information so as to obtain converted biometric information;

an extracting part configured to extract feature information from the converted biometric information so as to obtain extracted feature information; and a verifying part configured to verify the extracted feature information with respect to registered information which is registered in advance, by comparing the extracted feature information and the registered information, so as to authenticate the individual, wherein said verifying part receives the registered information by a communication which is made via a medium, and said converting part uses an enciphering key which is used for the communication as the parameters used for the predetermined conversion process.

24. An authentication apparatus comprising:

a measuring part configured to measure biometric information of an individual;

an extracting part configured to extract feature information from the biometric information so as to obtain extracted feature information;

a converting part configured to carry out a predetermined conversion process with respect to the extracted feature information so as to obtain converted extracted feature information; and a verifying part configured to verify the converted extracted feature information with respect to registered information which is registered in advance, by comparing the converted extracted feature information and the registered information, so as to authenticate the individual, wherein said verifying part receives the registered information by a communication which is made via a medium, and said converting part uses an enciphering key which is used for the communication as the parameters used for the predetermined conversion process.

* * * * *